(12) United States Patent
Ahmad et al.

(10) Patent No.: US 11,706,677 B2
(45) Date of Patent: Jul. 18, 2023

(54) HANDOVER PROCESSING BETWEEN COMMUNICATION NETWORKS

(71) Applicant: T-Mobile USA, Inc., Bellevue, WA (US)

(72) Inventors: Syed Toaha Ahmad, Renton, WA (US); Zeinab Mahdavifar, Kirkland, WA (US); Michael L. Kim, Bellevue, WA (US); Adnan Rahat, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 125 days.

(21) Appl. No.: 17/061,285

(22) Filed: Oct. 1, 2020

(65) Prior Publication Data

US 2022/0110034 A1    Apr. 7, 2022

(51) Int. Cl.
| | |
|---|---|
| *H04W 36/00* | (2009.01) |
| *H04W 36/14* | (2009.01) |
| *H04L 43/10* | (2022.01) |
| *H04L 5/00* | (2006.01) |
| *H04L 43/16* | (2022.01) |
| *H04B 17/318* | (2015.01) |

(52) U.S. Cl.
CPC ...... *H04W 36/0094* (2013.01); *H04B 17/318* (2015.01); *H04L 5/0048* (2013.01); *H04L 43/10* (2013.01); *H04L 43/16* (2013.01); *H04W 36/14* (2013.01)

(58) Field of Classification Search
CPC ....... H04W 36/0072; H04W 36/00837; H04W 36/0085; H04W 36/14
See application file for complete search history.

(56) References Cited

U.S. PATENT DOCUMENTS

| | | | | |
|---|---|---|---|---|
| 11,122,484 | B2* | 9/2021 | Zhong | H04W 36/00837 |
| 2003/0119527 | A1* | 6/2003 | Labun | H04L 67/14 |
| | | | | 455/456.1 |
| 2007/0091844 | A1* | 4/2007 | Huang | H04W 36/24 |
| | | | | 455/436 |
| 2009/0104909 | A1* | 4/2009 | Vesely | H04W 36/08 |
| | | | | 455/436 |
| 2012/0230304 | A1* | 9/2012 | Barbu | H04W 48/18 |
| | | | | 370/338 |
| 2013/0189996 | A1* | 7/2013 | Sridhar | H04W 36/00835 |
| | | | | 455/444 |

(Continued)

*Primary Examiner* — Yee F Lam
(74) *Attorney, Agent, or Firm* — Lee & Hayes, P.C.

(57) ABSTRACT

A user equipment (UE) for handover processes between communication networks includes one or more processors, and one or more non-transitory computer-readable media storing instructions that when executed by the one or more processors, cause the UE to receive, by the UE, first diagnostic information, determine whether to perform a first handover from a first communication network to a second communication network based on a first set of thresholds, the first set of thresholds being based on the first diagnostic information, receive, by the UE, an update of the first diagnostic information, and determine whether to perform a second handover from the first communication network to the second communication network based on an updated first set of thresholds, the updated first set of thresholds being based on the updated first diagnostic information.

20 Claims, 7 Drawing Sheets

(56) References Cited

U.S. PATENT DOCUMENTS

| | | | |
|---|---|---|---|
| 2015/0327139 A1* | 11/2015 | Sirotkin | H04W 76/27 |
| | | | 370/332 |
| 2016/0007260 A1* | 1/2016 | Abraham | H04W 36/0085 |
| | | | 370/331 |
| 2016/0345217 A1* | 11/2016 | Tabet | H04B 17/336 |
| 2017/0303179 A1* | 10/2017 | Mitsui | H04W 36/245 |
| 2018/0098258 A1* | 4/2018 | Annam | H04W 36/305 |
| 2020/0045602 A1* | 2/2020 | Jiang | H04W 36/0058 |
| 2020/0252820 A1* | 8/2020 | Ozturk | H04W 74/004 |
| 2020/0252850 A1* | 8/2020 | Zhong | H04W 36/00837 |
| 2020/0305072 A1* | 9/2020 | Lunden | H04W 48/20 |
| 2020/0322856 A1* | 10/2020 | Wang | H04W 76/10 |
| 2020/0322863 A1* | 10/2020 | Wang | H04W 48/16 |
| 2023/0051540 A1* | 2/2023 | Sui | H04W 36/0061 |

* cited by examiner

200

| Use Case | Wi-Fi Coverage | Cellular Coverage | RAT Preference |
|---|---|---|---|
| Call initiated in LTE | GOOD | GOOD | Cellular |
| Call initiated in LTE | GOOD | BAD | Wi-Fi |
| Call initiated in LTE | BAD | GOOD | Cellular |
| Call initiated in LTE | BAD | BAD | Cellular |
| Call initiated in Wi-Fi | GOOD | GOOD | Cellular |
| Call initiated in Wi-Fi | GOOD | BAD | Wi-Fi |
| Call initiated in Wi-Fi | BAD | GOOD | Cellular |
| Call initiated in Wi-Fi | BAD | BAD | Wi-Fi |

202 — Use Case; 204 — Wi-Fi Coverage; 206 — Cellular Coverage; 208 — RAT Preference; 210 — (LTE-initiated rows); 212 — (Wi-Fi-initiated rows)

*FIG. 2*

HANDOVER PROCESSING BETWEEN COMMUNICATION NETWORKS

BACKGROUND

Modern terrestrial telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, and Evolved High-Speed Packet Access (HSPA+) are examples of 4G telecommunications technologies. Further, the advent of fifth generation (5G) cellular-wireless access technologies and other predecessor LTE technologies to be developed in the future provide improved bandwidth and decreased response times to a multitude of devices that may be connected to a network.

Further, these modern terrestrial telecommunication systems may include a separate network including IEEE 802.11-based technologies and its progeny (also referred to as a Wi-Fi network), IEEE 802.15-based technologies and its progeny (e.g., Zigbee, Bluetooth, Low-Rate Wireless Personal Area Networks, Wireless HART, MiWi), IEEE 802.16-based technologies (WiMAX), WLAN, near-field communications, and infrared communications. These telecommunication technologies may be referred to as Wi-Fi networks, and provide local area networking (LAN) for these telecommunications devices as well as access to the Internet. Thus, a telecommunications device may utilize both a cellular networks and Wi-Fi networks in providing telecommunication services for a user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates example of handover scenarios, according to an example of the principles described herein.

DETAILED DESCRIPTION

Figure 1:
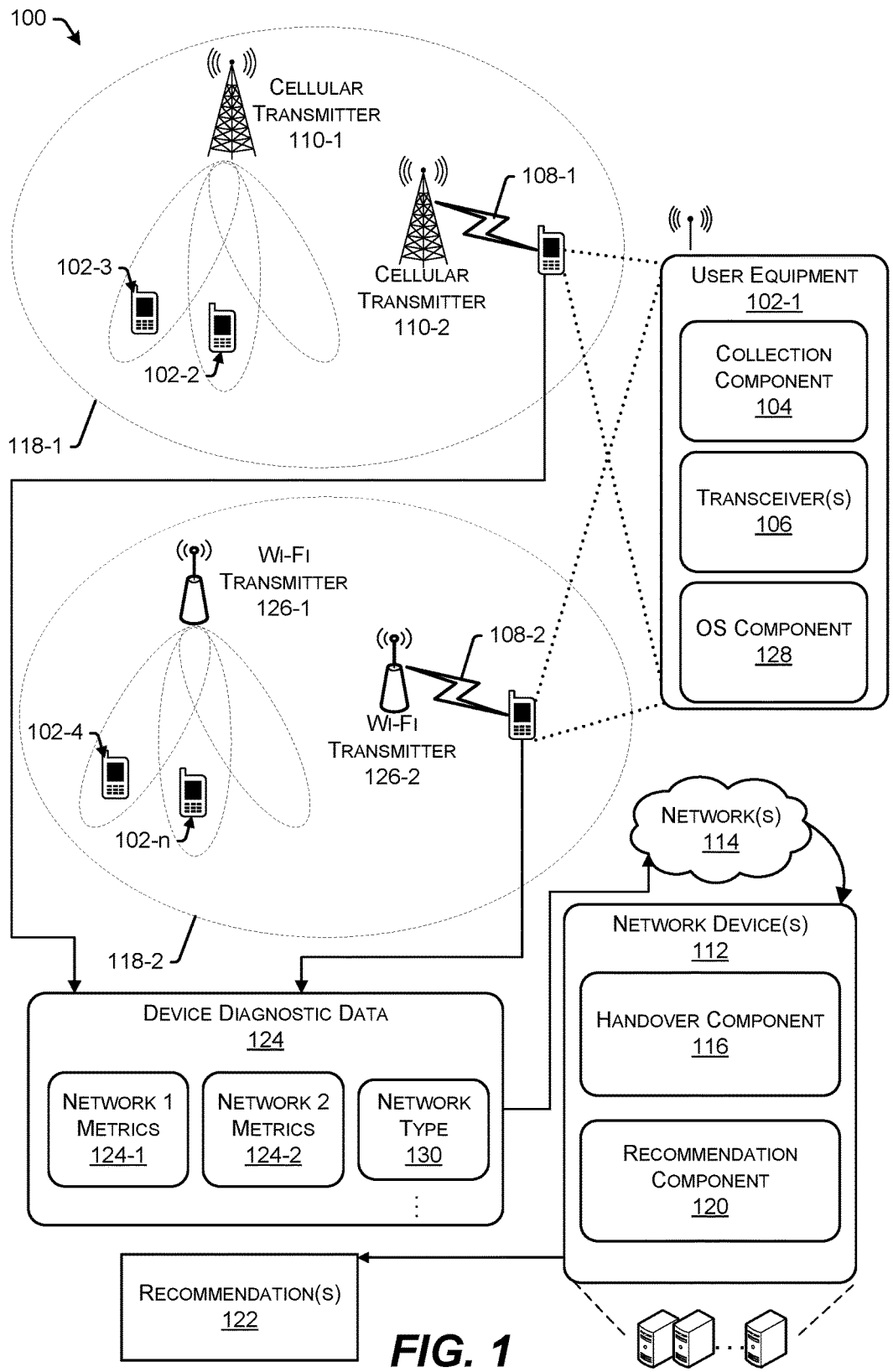
FIG. 1 is a block diagram showing an illustrative environment that utilizes user equipment (UE) to perform a handover process, according to an example of the principles described herein.

Described herein are devices, systems, and methods relating to determining whether and under what conditions to perform a handover process from a first telecommunications network to a second telecommunications network. Further, the devices, systems, and methods described herein provide for receiving, by the UE, first diagnostic information, determine whether to perform a first handover from a first communication network to a second communication network based on a first set of thresholds, the first set of thresholds being based on the first diagnostic information, receive, by the UE, an update of the first diagnostic information, and determine whether to perform a second handover from the first communication network to the second communication network based on an updated first set of thresholds, the updated first set of thresholds being based on the updated first diagnostic information.

The devices, systems, and methods described herein provide for receiving, by a user equipment (UE), first diagnostic information associated with a first communication. The first diagnostic information includes first data defining a first reference signals received power (RSRP) of a first telecommunication network, and second data defining a first received signal strength indicator (RSSI) of a second telecommunication network. The devices, systems, and methods described herein also provide for defining a first ping-pong timer value for the first communication network based on the RSRP, and performing a first handover from the first communication network to the second communication network in response to the RSRP being at least less than a first threshold, the RSSI being at least greater than a second threshold, and the first ping-pong timer value having expired.

The devices, systems, and methods described herein also provide for receiving, by a user equipment (UE), first diagnostic information associated with a first communication network. The first diagnostic information includes first data defining a first reference signals received power (RSRP) value, and second data defining a first received signal strength indicator (RSSI) value. The devices, systems, and methods described herein also provide for defining a first ping-pong timer value for the first communication network based on the first diagnostic information, and determining whether to perform a first handover from the first communication network to a second communication network in response to the RSRP value being at least less than a first threshold, the RSSI value being at least greater than a second threshold, and the first ping-pong timer value having expired. The devices, systems, and methods described herein also provide for receiving, by the UE, updated first diagnostic information, the updated first diagnostic information defining at least one of an updated first threshold, an updated second threshold, and an updated first ping-pong timer value, and determining whether to perform a second handover from the first communication network to the second communication network based on the updated first diagnostic information.

The devices, systems, and methods described herein also provide for in response to a determination that the RSRP value and the RSSI value are the same in the first diagnostic information and the updated first diagnostic information, and at least one of the first threshold, the second threshold, and the first ping-pong timer value are different from the updated first threshold, the updated second threshold, and the updated first ping-pong timer value, respectively, performing the second handover. The devices, systems, and methods described herein also provide for receiving, by the UE, second diagnostic information associated with a second communication network. The second diagnostic information includes third data defining a second RSRP, and fourth data defining a second RSSI. The devices, systems, and methods described herein also provide for defining a second ping-pong timer value for the second communication network based on the second diagnostic information, and determining whether to perform a third handover from the second communication network to the first communication network in response to the RSRP being at least greater than a third threshold, the RSSI being at least less than a fourth threshold, the RSRP being at least greater than the first threshold, and the second ping-pong timer value having expired. The devices, systems, and methods described herein also provide for receiving, by the UE, updated second diagnostic information, the updated second diagnostic information defining at least one of an updated third threshold, an updated fourth threshold, and an updated second ping-pong timer value, and determining whether to perform a fourth handover from the second communication network to the first communication network based on the updated second diagnostic information. The devices, systems, and methods described herein also provide for, in response to a determination that the RSRP value and the RSSI value are the same in the second diagnostic information and the updated second diagnostic information, and at least one of the third threshold, the fourth threshold, and the second ping-pong timer value are different from the updated third threshold, the updated fourth threshold, and the updated second ping-pong timer value, respectively, performing the fourth handover.

Each of the myriad of original equipment manufacturers (OEMs) manufacture UEs that have differing radio frequency (RF) characteristics. Handover processes for each of these UEs may also differ and may depend on different parameters of the UEs including, for example, the chipsets and the RF antennas utilized by the UEs. Further, the UEs may use a number of different wireless access technologies such as, for example, 3G, 4G, 4G LTE, and 5G, among other cellular network technologies as a first type of telecommunications network. Still further, the UEs may use a number of different wireless access technologies such as, for example, Wi-Fi, among other local area network technologies as a second type of telecommunications network.

The handover processes described herein may adjust handover thresholds for each UE which improves a dropped call rate (DCR), a quality of service (QoS) measuring overall performance of the telecommunications service, a handover rate, and other metrics that may be used to define a user's experience utilizing a UE on the telecommunication networks. The devices, systems, and methods described herein improve a user's experience with the telecommunications services provided by a service provider. Specifically, handover processes described herein uses the first threshold, the second threshold, the third threshold, and the fourth threshold to determine when to perform a handover from the first type of telecommunications network to the second type of telecommunications network, and vice versa.

Device diagnostic data may be collected from a UE to determine whether to perform a handover process. The handover processes in cellular telecommunications as described herein includes any process of transferring an ongoing call, data session, or data transfer from one communications channel to another communications channel. The term handover may also be referred to as a "handoff."

The device diagnostic data may include any data defining interactions between the UE and the telecommunications networks at a network layer perspective. For example, the device diagnostic data may include a signal strength of the telecommunications networks or channels, hysteresis associated with the interaction between a UE and the telecommunications networks or channels, a dropped call rate (DCR), handover rates, and other telecommunications metrics as described herein. The device diagnostic data collected from the interaction between the UE and the telecommunications networks is used to determine whether to perform a handover process.

The device diagnostic data may include, but are not limited to, signal strength of a signal between the UE and a network transceiver in a telecommunications network, a type of network to which the UE is connected (e.g., cellular networks such as 5G LTE, 4G LTE, 3G, 2G, a wireless network such as Wi-Fi, no network, among others), a received signal strength (e.g., reference signal received power (RSRP), reference signal received quality (RSRQ), signal-to-interference-plus-noise ratio (SINR), received signal strength indicator (RSSI), energy per chip of the pilot channel over the noise power density (EcNo), etc.), LTE E-UTRAN cell identifier (ECI) (ENB-ID+CELLID), EN-DC capability of a cell (e.g., an LTE cell), list of 5G new radio (NR) cell information (e.g., communicated from an LTE primary cell (PCELL)), number of NR cells, NR cell ID, NR band name, NR bandwidth, LTE RRC state, NR RRC state, NR primary secondary cell (PSCell) physical cell id (PCI), NR PSCell band name, NR PSCell bandwidth, NR physical downlink shared channel (PDSCH) channel assignment status, NR PDSCH access status, NR PDSCH beam index, NR PSCell RSRP, NR PSCell SINR, NR PSCell RSRQ, NR PSCell EcNo, NR channel quality indicator, NR rank indicator, list of synchronization signal block (SSB) signal information (e.g., SSB beam index, RSRP, RSSI, SINR, RSRQ, EcNo, the band number, the bandwidth and the PCI of the 5G NR cell sending the beam), number of SSB beams detected by UE, SSB beam index, PCI for the cell that transmits the SSB name, band name, bandwidth, RSB RSSI, SINR, RSRQ, EcNo, network type user interface (UI) indicator status, data transmission UI indicator, number of antenna bars on the UI indicator, device signal strength, system crashes, DCRs, battery performance, application usages, UE location (e.g., via a user device-based global positioning system and/or Wi-Fi positioning system), a channel identifier (e.g., channel 1, 2, . . . N (where N is an integer)) and/or an indication of a frequency associated with a channel (e.g., 617-622 MHz, 622-627 MHz, 627-632 MHz, . . . , 647-652 MHz), among other types of device diagnostic data.

Further, device diagnostic data may include, but are not limited to, LAN (e.g., Wi-Fi) network metrics defining, for example, network packet loss, packet jitter, packet latency (delay), post-dial delay, and echo. These metrics may be determined by VoIP performance testing and monitoring. Voice over IP (VoIP) technology allows computer networks to become as useful as telephone networks for audio conversations, as well as supporting new applications with even stricter network performance requirements. Originating VoIP telephone calls may be similar to digital telephony and may include, for example, signaling, channel setup, digitization of the analog voice signals, and encoding. The digital information is packetized, and transmission occurs as IP packets over a packet-switched network. Media streams are transported using media delivery protocols that encode audio and video with audio codecs and video codecs. Various codecs exist that optimize the media stream based on application requirements and network bandwidth with some implementations relying on narrowband and compressed speech, while others support high-fidelity stereo codecs. Speech coding standards in VoIP may be based on the linear predictive coding (LPC) and modified discrete cosine transform (MDCT) compression methods. The codecs may include MDCT-based AAC-LD (e.g., used in FaceTime), LPC/MDCT-based Opus (e.g., used in WhatsApp), the LPC-based SILK (e.g., used in Skype), μ-law and A-law versions of G.711, G.722, and open source voice codec such as iLBC (e.g., G.729) that utilizes 8 kbit/s each way.

As an example, assume that a UE is enabled to utilize two different telecommunications networks to communicate via call to another UE, download and upload data to a data network, and perform other telecommunications and data transfer processes using the UE. The first telecommunications network may include an LTE cellular network and the second telecommunications network may include a Wi-Fi network (e.g., an IEEE 802.11 standard communications network). A handover process may be performed when the one of the first telecommunications network or the second telecommunications network the UE is currently utilizing experiences a drop-in service. A drop-in service may be defined herein as any decrease in an ability to communicate using the telecommunications network to which the UE is communicatively coupled.

In an example, the UE may remain communicatively coupled to one of either the first telecommunications network or the second telecommunications network so long as a signal quality of the telecommunications network exceeds the thresholds described herein. In this example, the first telecommunications network may include an LTE telecommunications network and the second telecommunications network may include a Wi-Fi telecommunications network. The thresholds may be chosen such that a quality of the telecommunication may be maintained during handover of the call from the LTE telecommunications network to the Wi-Fi telecommunications network. If the threshold is chosen too low, resulting in quality of the telecommunication being poor, the communication session of the UE may compromise the call and user experience before the UE connects to the Wi-Fi network. In another example, the telecommunications session via the LTE telecommunications network may be dropped completely prohibiting a connection to the Wi-Fi network.

A handover is controlled by a Radio Network Controller and may be triggered based on measurement values of the quality of the uplink signal measured by the base station and measurement reports on downlink quality sent by the UE. Measurement reports transmitted from the UE may be periodic or triggered. Different radio networks may utilize different strategies for measurement reporting unlike in GSM where the signal strength referred to as received signal strength indication RSSI is used for the decision. UMTS uses additional criteria as neighboring base stations transmit on the same frequency. A UE does not only receive the signal of the current serving base station but also the signals of the neighboring base stations which, from its point of view, are considered to be noise. In UMTS, the RSSI, RSCP, and EcNo, values are used. In one example, the 3GPP UMA/GAN standard, for example, enables GSM/UMTS handover to Wi-Fi and vice versa, and the UEs and associated system described herein may utilize the 3GPP UMA/GAN standard to provide handover processing.

As to the thresholds described herein, the first threshold is a first wireless broadband communication network threshold, and the second threshold is a first IEEE 802.11 standard communication network threshold. The third threshold is a second wireless broadband communication network threshold of a lower value relative to the first wireless broadband communication network threshold, and the fourth threshold is a second IEEE 802.11 standard communication network threshold of a higher value relative to the first IEEE 802.11 standard communication network threshold.

The devices, systems, and methods described herein further adjust a length of the first ping-pong timer value and the second ping-pong timer value based on the device diagnostic data. Further, at least one of the first threshold, the second threshold, the third threshold, and the fourth threshold may be adjusted based on the device diagnostic data. The UE may be a smart phone, a mobile phone, a cell phone, a tablet computer, a portable computer, a laptop computer, a personal digital assistant (PDA), an electronic book device, a wearable device, or another portable device. Additional examples of the UE include, but are not limited to, smart devices such as televisions, refrigerators, washing machines, dryers, smart mirrors, coffee machines, lights, lamps, temperature sensors, music players, headphones, or any other electronic appliances that may generate, request, receive, transmit, or exchange voice, video, and/or digital data over a telecommunications network.

Determining under what conditions to perform a handover may be difficult. Using techniques described herein, the device diagnostic data is utilized to determine those conditions under which a handover process should be performed. Further, the devices, systems, and methods described herein minimize or eliminate software updates that require a software release. Further, the DCR, QoS, handover rate, and other metrics are improved due to the implementation of the devices, systems, and methods described herein.

In one example, the UE may be configured to collect the device diagnostic data related to the metrics in response to a variety of triggers. Example triggers may include but are not limited to sending or receiving a voice call, an application-based trigger (e.g., launching a video-streaming application or some other type of application), an indication of signal loss as determined by the UE and/or by network devices, and battery level thresholds, among other triggering events. The UE may also collect the data on a periodic basis (e.g., hourly, every minute, every second, etc.), and save the information to a local device memory, non-local device memory, other memory communicatively coupled to the UE, and combinations thereof. Further, in one example, a component of the telecommunications network (e.g., a server, service, etc.) may collect the metrics described herein as crowdsourced from multiple UEs.

The system may also generate device diagnostic data that represents information about the UE and connections to the telecommunications network. For example, the system may generate device diagnostic data defining relative signal strengths of a plurality of wireless telecommunication networks. The device diagnostic data may also include definitions of wireless access technologies being utilized. For instance, the device diagnostic data may define a location of the UE that utilizes (or could utilize) a particular wireless access technology (e.g., 5G, Wi-Fi, etc.). In some examples, the device diagnostic data may form part of a recommendation that may indicate when to perform a handover process, and/or be used to generate a recommendation for a handover process.

In one example, a collection component used to capture device diagnostic data associated with metrics may be implemented as an application or component running on the UE, or a component of at least one of the plurality of telecommunications networks. The collection component may determine, based at least in part on the device diagnostic data, when and how to perform the handover process as described herein. The collection component may instruct an operating system component to control software and/or hardware associated with a transceiver of the UE to scan various channels in a frequency resource to determine metrics associated with the frequency resource. In an example, the frequency resource may be outside of a frequency band or range used by the UE to conduct communications. The one or more metrics may be sent to the network device for aggregation and determination of the signal strength of at least one of the plurality of telecommunication networks.

In some examples, the techniques described herein may be implemented on a UE configured to facilitate user communications using first frequency resources. In one example, the first frequency resources may include, but are not limited to, an LTE Band 12 (e.g., a 700 MHz Band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a UMTS Band 4, UMTS Band 2, GSM Band 2, 5G (e.g., 3.5 GHz-6 GHz, 28 GHz, etc.) and the like. Further, a collection component may be implemented as an application on the UE to intermittently scan second frequency resources. In one example, the second frequency resources may be separate from the first frequency resources. For example, the second frequency resources may include, but are not limited to, a Wi-Fi band such as, for example, a 900 MHz, 2.4 GHz, 3.6 GHz, 4.9 GHz, 5 GHz, 5.9 GHz and 60 GHz bands, among other Wi-Fi radio frequency bands. The first frequency resource and the second frequency resource may include any range of wireless frequencies capable of being used to communicate data. Thus, in general, the techniques may include the UE using the first frequency resources for communication(s) (e.g., voice communication, data communications, etc.), and may use the collection component to scan the second frequency resources, without using the second frequency resources for communication(s) and vice versa.

The systems, devices, and techniques described herein may be implemented in a number of ways. Example implementations are provided below with reference to the following figures.

FIG. 1 is a block diagram showing an illustrative environment that utilizes user equipment (UE) 102 to collect device diagnostic data 124, associated with a plurality of telecommunications networks 118, that are utilized to determine when and under what circumstances to perform a handover process between different wireless access technologies and/or one or more recommendations to do so, as described herein.

In one example, a UE 102, such as UE 102-1, UE 102-2, UE 102-3, UE 102-4, and 102-n, where n is any integer greater than or equal to q (collectively referred to herein as UE(s) 102 unless specifically addressed otherwise) may include a collection component 104 and one or more transceiver(s) 106. The UE 102 may receive a signal 108-1, 108-2 (collectively referred to herein as signal(s) 108 unless specifically addressed otherwise) output by a cellular transmitter 110-1, 110-2 (collectively referred to herein as cellular transmitter(s) 110 unless specifically addressed otherwise) and/or a Wi-Fi transmitter 126-1, 126-2 collectively referred to herein as Wi-Fi transmitter(s) 126 unless specifically addressed otherwise) to collect and determine one or more metrics. The metrics may include metrics associated with a cellular telecommunication network 118-1 and/or a Wi-Fi telecommunication network 118-2. In one example, the UE 102 may receive signals, such as a first signal 108-1 and/or a second signal 108-2, from one or more transmitters 110, 126 within the telecommunications networks 118-1, 118-2. The UEs 102 may be configured to receive different signals. For example, the UEs 102 may be configured to receive signals 108-1 output by the cellular transmitters 110 (e.g., LTE, and/or other cellular wireless access technologies) and/or are configured to receive signals 108-2 output by the Wi-Fi transmitters 126 (e.g., wireless access technologies that form a LAN such as those defined under an IEEE standard, near-field communications, and infrared communications, among others). Further, the UEs 102 are able to switch between these telecommunication technologies. In one example, the transmitters 110, 126 may represent any one-directional or two-directional wireless communication transceiver that support their respective telecommunication technologies.

In one example, the one or more transceiver(s) 106 individually included in the UEs 102 may receive the signal 108-2, 108-2 at the UE 102, and the collection component 104 may receive and determine various device diagnostic data 124 associated with the signal 108-1, 108-2. The device diagnostic data 124 may include any data defining interactions between the UE and the telecommunications networks from a network layer perspective. For example, the one or more device diagnostic data 124 may include, but are not limited to, signal strength of a signal between the UE 102 and a network transceiver 106 in the mobile device telecommunications network, hysteresis associated with the interaction between a UE and the telecommunications networks or channels, a type of network that the user device is connected to (e.g., 5G, LTE, 3G, 2G, no network, etc.), a received signal strength (e.g., reference signal received power (RSRP), reference signal received quality (RSRQ), signal-to-interference-plus-noise ratio (SINR), received signal strength indicator (RSSI), energy per chip of the pilot channel over the noise power density (EcNo), etc.), LTE E-UTRAN cell identifier (ECI) (ENB-ID+CELLID), EN-DC capability of a cell (e.g., an LTE cell), list of 5G new radio (NR) cell information (e.g., communicated from an LTE primary cell (PCELL)), number of NR cells, NR cell ID, NR band name, NR bandwidth, LTE RRC state, NR RRC state, NR primary secondary cell (PSCell) physical cell id (PCI), NR PSCell band name, NR PSCell bandwidth, NR physical downlink shared channel (PDSCH) channel assignment status, NR PDSCH access status, NR PDSCH beam index, NR PSCell RSRP, NR PSCell SINR, NR PSCell RSRQ, NR PSCell EcNo, NR channel quality indicator, NR rank indicator, list of synchronization signal block (SSB) signal information (e.g., SSB beam index, RSRP, RSSI, SINR, RSRQ, EcNo, the band number, the bandwidth and the PCI of the 5G NR cell sending the beam), number of SSB beams detected by UE, SSB beam index, PCI for the cell that transmits the SSB name, band name, bandwidth, RSB RSSI, SINR, RSRQ, EcNo, network type user interface (UI) indicator status, data transmission UI indicator, number of antenna bars on the UI indicator, UE location (e.g., via a user device-based global positioning system and/or Wi-Fi positioning system), a channel identifier (e.g., channel 1, 2, . . . N (where N is an integer)) and/or an indication of a frequency associated with a channel (e.g., 617-622 MHz, 622-627 MHz, 627-632 MHz, . . . , 647-652 MHz), a dropped call rate (DCR), handover rates, and other telecommunications metrics.

In one example, the device diagnostic data 124 may be determined independently for a channel or for a block of frequencies. Other types of device diagnostic data 124 may be collected by the UEs 102 in addition to those described herein that may be used to assist the UEs 102 in performing handover processes between the cellular telecommunication network 118-1 and the Wi-Fi telecommunication network 118-2, and vice versa.

As briefly described above, the UEs 102 may be configured to collect the device diagnostic data 124 in response to a variety of triggers. The collection procedure may involve different steps. In some examples, the collection is triggered by an event, such as use of an application on the UEs 102. For example, when a telecommunications application, and/or a web browser application or other data-consuming application is executed, the application may utilize a timer to collect the device diagnostic data 124 periodically while the application is in use (e.g., every 20, 40, 60 seconds, . . . ), until execution of the application is stopped, the screen of the UE 102 is turned off, or some other terminating event is executed. Example triggers may include but are not limited to sending or receiving a voice call, an application-based trigger, an indication of a signal as determined by the UE 102 and/or by network devices, and battery level thresholds, among other triggers. The UEs 102 may also collect the device diagnostic data 124 on a periodic basis (e.g., hourly), and save the information to a local device memory (e.g., removable storage 318 or non-removable storage 320 of FIG. 3).

According to some examples, the UE 102, or some other device or component within the environment 100 may utilize functionality provided by an Application Programming Interface (API) (not shown) to collect the data associated with the device diagnostic data 124. In some configurations, the API may include functions for determining metrics associated with different wireless access technologies (e.g., LTE, Wi-Fi). For example, the following are examples of functions that may be executed to obtain the device diagnostic data 124. A first function (e.g., "getPdschBeamSignalCondition( )") may return RSRP, RSSI, RSRQ, SINR. RSSI, EcNo, and other reportable or collectable device diagnostic data 124 together with a timestamp. A second function (e.g. "LTE ECI (ENB-ID+CELLID)") may be used to obtain the globally unique cell identity in the context of a public land mobile network (PLMN). This device diagnostic data 124 may be used to retrieve additional cell information from a transmitter 110, 126 on the network such as a location of the cell. A third function (e.g., "EN-DC CAPABILITY OF THE LTE PCELL") may be received from the serving cell of the cellular telecommunication network 118-1 and used to identify if the UE 102 is in LTE coverage where an LTE-based signal may be expected and/or received from a serving cell of the Wi-Fi telecommunication network 118-2 and used to identify if the UE 102 is in Wi-Fi coverage where a Wi-Fi-based signal may be expected. A fourth functions may also be executed to obtain cell information, such as a list of cell information communicated from the telecommunication networks 118-1, 118-2. The cell information may include information such as cell ID, Band Name, and Bandwidth. The API format may be defined either to get the information for all the cells as a list or to get the information for one cell at a time with a parameter. API calls may also be made to obtain other types of device diagnostic data 124, such as any of the device diagnostic data 124 described herein.

As a particular example for purposes of explanation, during the collection of the device diagnostic data 124, the UE 102 may determine EN-DC capability, 3GPP UMA/GAN standards, among others of an LTE PCell and/or the Wi-Fi telecommunication network 118-2 to identify if the UE 102 is in the potential coverage for a wireless access technology. The EN-DC capability of the LTE PCell indicates whether an LTE cell may work with a 5G cell to serve an EN-DC capable device or not. Further, the 3GPP UMA/GAN standard capability of the LTE PCell indicates whether an LTE cell may work with a W-Fi cell to serve an 3GPP UMA/GAN standard capable device or not. For example, if the return value is 'true,' there is a chance for a 5G connection/Wi-Fi connection. If the return value is 'na,' that indicates there is not a chance for a 5G connection/Wi-Fi connection. If the LTE PCell is EN-DC capable, the device is in an area as illustrated by dashed line 118-1. If the LTE PCell is not EN-DC capable, then 118-1 would not include the cellular transmitter 110-1. Similarly, if the LTE PCell is 3GPP UMA/GAN standard capable, the device is in an area as illustrated by dashed line 118-2. If the LTE PCell is not 3GPP UMA/GAN standard capable, then 118-2 would not include the Wi-Fi transmitter 126-1.

The UE 102 may detect one or a plurality of signals 108 from the cellular telecommunication network 118-1 and/or a Wi-Fi telecommunication network 118-2. By analyzing the conditions of the signals 108 detected by the UE 102, the LTE and Wi-Fi coverage for the UE 102 may be determined. In one example, the UE 102 collects information that identifies the network status of the UE 102. While a particular example has been illustrated, the techniques described herein may be utilized with other different wireless access technologies.

The environment 100 may further include at least one network device 112. In some examples, the network device(s) 112 are configured to collect the device diagnostic data 124 from the UEs 102 that represents information about the UEs 102 and connections to the telecommunications networks 118-1, 118-2. The network device(s) 112 are also configured to determine if conditions are met to perform a handover process between the cellular telecommunication network 118-1 and the Wi-Fi telecommunication network 118-2. Further, the network device(s) 112, via a recommendation component 120, is configured to provide a recommendation regarding performance of the handover processes and the setting and adjustment of thresholds associated with handover processes.

In one example, a collection component 104 may be implemented as an application or component running on the UE 102, or a component of one or both of the telecommunications networks 118-2, 118-2. The collection component 104 may determine, based at least in part on the device diagnostic data 124, the telecommunications network 118-1, 118-2 to which the network transceiver is receiving the signals 108. The collection component 104 may instruct an operating system component 128 of the UE 102 to control software and/or hardware associated with the transceiver(s) 106 of the UE 102 to scan various channels in a frequency resource to determine the device diagnostic data 124 associated with the telecommunications networks 118-1, 118-2. In one example, the frequency resource may be outside of a frequency band or range used by the UE to conduct communications.

The UE 102 may communicate with one or more network device(s) 112 via one or more network(s) 114. For example, the transceiver(s) 106 of the UE 102 may transmit the device diagnostic data 124 to the one or more network device(s) 112, where the device diagnostic data 124 include various data associated with the telecommunications networks 118-1, 118-2 utilizing different wireless access technologies (e.g. LTE and Wi-Fi telecommunication technologies).

FIG. 1 illustrates the UE 102 capturing device diagnostic data 124 associated with the cellular transmitters 110 and the Wi-Fi transmitters 126, as described herein. Many more UEs 102 and/or transmitters 110, 126, however, may be utilized. In one example, the UE 102 may receive the signals 108 output by the transmitters 110, 126 and may determine the device diagnostic data 124 associated with the signals 108. As illustrated, the device diagnostic data 124 associated with the signals 108 may include information indicative of signal strength of the signals 108 as it is received at the UE 102, location of the UE 102, and other information. For example, the device diagnostic data 124 depicted in FIG. 1 may include network 1 metrices 124-1 that are associated with a first wireless access technology (e.g., LTE), network 2 metrices 124-2 that are associated with a second wireless access technology (e.g., Wi-Fi), a network type 130 metric, and other device diagnostic data 124 defining metrics such as described herein. The device diagnostic data 124, and particularly, the example information included in the device diagnostic data 124 as depicted in FIG. 1, are only examples and are not meant to be limiting.

In one example, the network device(s) 112 may include a handover component 116 that may receive the one or more device diagnostic data 124 from the UE 102, as well as other user equipment, and aggregate the device diagnostic data 124 that are utilized to determine when to perform a handover process. Further, the handover component 116 may perform the handover process as described herein. Further, the handover component 116 may be used, along with the recommendation component 120, to generate one or more recommendation(s) 122. In examples described herein, the recommendations may be used to determine and/or indicate signal strengths of the cellular telecommunication network 118-1 and/or a Wi-Fi telecommunication network 118-2 that meets or exceeds thresholds described herein and used to determine and/or indicate when to perform the handover processes.

For example, the recommendation component 120 may be configured to determine whether or not the UE 102 should perform a handover process between the cellular telecommunication network 118-1 and the Wi-Fi telecommunication network 118-2 and vice versa. The recommendation component 120 may utilize the device diagnostic data 124, and generate the one or more recommendation(s) 122, which may include information indicating to perform the handover process. The handover component 116 and the recommendation component 120 are not limited to determining and outputting the recommendation(s) 122, and any number of recommendation(s), or data may be utilized, as described herein.

Examples of the UE 102 may include, but are not limited to, smart phones, mobile phones, cell phones, tablet computers, portable computers, laptop computers, personal digital assistants (PDAs), electronic book devices, or any other portable electronic devices that may generate, request, receive, transmit, or exchange voice, video, and/or digital data over a network such as the cellular telecommunication network 118-1 and the Wi-Fi telecommunication network 118-2. Additional examples of the UE 102 may include, but are not limited to, smart devices such as televisions, refrigerators, washing machines, dryers, smart mirrors, coffee machines, lights, lamps, temperature sensors, music players, headphones, or any other electronic appliances that may generate, request, receive, transmit, or exchange voice, video, and/or digital data over a network.

In one example, the network device(s) 112 may be implemented as one or more communication servers to facilitate communications by and between the various devices in the environment 100. That is, the network device(s) 112 may represent any computing devices implementing various aspects of one or more of second, third, fourth, and fifth generation (2G, 3G, 4G, and 5G) cellular-wireless access technologies and which may operate collectively to provide data communication services. Global Systems for Mobile (GSM) is an example of 2G telecommunications technologies, Universal Mobile Telecommunications System (UMTS) is an example of 3G telecommunications technologies, Long Term Evolution (LTE), including LTE Advanced, and Evolved High-Speed Packet Access (HSPA+) are examples of 4G telecommunications technologies, and New Radio (NR) is an example of 5G telecommunication technologies. Thus, the network device(s) 112 may implement GSM, UMTS, LTE/LTE, and/or NR Advanced telecommunications technologies.

Further, the network device(s) 112 may represent any computing devices implementing various aspects of one or more of terrestrial telecommunication systems including, for example, IEEE 802.11-based technologies and its progeny (also referred to as a Wi-Fi network), IEEE 802.15-based technologies and its progeny (e.g., Zigbee, Bluetooth, Low-Rate Wireless Personal Area Networks, Wireless HART, MiWi), IEEE 802.16-based technologies (WiMAX), WLAN, near-field communications, and infrared communications, among others).

The network device(s) 112 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), a wireless access point (WAP) a wireless adapter, a wireless router, a wireless network bridge, or any other data traffic control entity configured to communicate and/or route data packets between the UE 102, the network device(s) 112, and/or the network(s) 114. In some examples, the network device(s) 112 may be operated by a service provider. While FIG. 1 illustrates the network device(s) 112, in the context of this document the techniques described herein may also be implemented in other networking technologies, such as nodes that are part of a wide area network (WAN), metropolitan area network (MAN), local area network (LAN), neighborhood area network (NAN), and personal area network (PAN), among other types of networks.

The network(s) 114 may also include cellular and/or terrestrial networks. Examples of the network(s) 114 may include but are not limited to networks including second-generation (2G), third-generation (3G), fourth-generation (4G), or fifth-generation (5G) cellular networks, such as NR (New Radio), LTE (Long Term Evolution), and data networks, such as Wi-Fi networks.

In one example, the UEs 102 may communicate with any number of user equipment, servers, network devices, computing devices, and the like. Further, in one example, the UEs 102 may send the device diagnostic data 124 to a network device (such as the network device(s) 112) for aggregation and processing. In one example, the UEs 102 may monitor the signal s108 without utilizing the frequency resources associated with the signal for communication(s). That is, the UEs 102 may communicate with other devices using a separate base station or wireless transceiver, not illustrated in FIG. 1.

FIG. 2 illustrates example of handover scenarios 200. The handover scenarios 200 may include a use case 202 determined at an initiation of a call or transfer of data, an indication of Wi-Fi coverage 204, an indication of cellular coverage 206, and a radio access technology (RAT) preference based on the initiated use case 202 and the indication of Wi-Fi coverage 204, and the indication of cellular coverage 206. The information displayed in the handover scenarios 200 include scenarios in which the call is initiated via an LTE network referred to herein as an LTE initiated call 210. The information displayed in the handover scenarios 200 also includes scenarios in which the call is initiated via a Wi-Fi network referred to herein as a Wi-Fi initiated call 212. Here, "call" includes an ongoing call, data session, data transfer, and/or combinations thereof.

The indication of Wi-Fi coverage 204 and the indication of cellular coverage 206 may include indications of "good" and "bad." These designations may be based on thresholds of signal strength obtained as part of the device diagnostic data 124. For example, the thresholds may include an LTE_High value of approximately −114 decibel-milliwatts (dBm) and an LTE_Low value of approximately −109 dBm. The thresholds may also include a Wi-Fi_High value of approximately −80 dBm and a Wi-Fi_Low value of approximately −70 dBm. The LTE_High value is referred to herein and in the claims as the first threshold. The LTE_Low value is referred to herein and in the claims as the third threshold. The Wi-Fi_Low value is referred to herein and in the claims as the second threshold. The Wi-Fi_High value is referred to herein and in the claims as the fourth threshold.

With regard to the LTE initiated calls 210, a situation where the cellular coverage is "good" may include when the RSRP is at least greater than or equal to the LTE_High value and/or at least greater than or equal to the LTE_Low value. A situation where the cellular coverage is "bad" is when the RSRP is at least lesser or equal to the LTE_High value and/or at least lesser or equal to the LTE_Low value.

With regard to the Wi-Fi initiated calls 212, a situation where the Wi-Fi coverage is "good" may include when the RSSI is at least greater than or equal to the Wi-Fi_High value and/or at least greater than or equal to the Wi-Fi_Low value. A situation where the Wi-Fi coverage is "bad" is when the RSSI is at least lesser or equal to the Wi-Fi_High value and/or at least lesser or equal to the Wi-Fi_Low value.

In situations where the call or data transfer instance is initiated in LTE (e.g., the cellular telecommunication network 118-1) as indicated by 210, if both the Wi-Fi coverage 204 and the cellular coverage 206 is "good," the RAT preference is to the cellular telecommunication network 118-1, and no handover process is performed. Further, in the state of 210 and in situations where the Wi-Fi coverage 204 is "good" but the cellular coverage 206 is "bad," the RAT preference is to the Wi-Fi telecommunication network 118-2, and a handover process may be performed. Still further, in the state of 210 and in a situation where the Wi-Fi coverage 204 is "bad" but the cellular coverage 206 is "good," the RAT preference is to the cellular telecommunication network 118-1, and no handover process is performed. Further, in the state of 210 and in situations where both the Wi-Fi coverage 204 and the cellular coverage 206 is "bad," the RAT preference is to the cellular telecommunication network 118-1, and no handover process is performed.

In situations where the call or data transfer instance is initiated in Wi-Fi (e.g., the Wi-Fi telecommunication network 118-2) as indicated by 212, if both the Wi-Fi coverage 204 and the cellular coverage 206 is "good," the RAT preference is to the cellular telecommunication network 118-1, and a handover process is performed. Further, in the state of 212 and in situations where the Wi-Fi coverage 204 is "good" but the cellular coverage 206 is "bad," the RAT preference is to the Wi-Fi telecommunication network 118-2, and no handover process is performed. Still further, in the state of 212 and in a situation where the Wi-Fi coverage 204 is "bad" but the cellular coverage 206 is "good," the RAT preference is to the cellular telecommunication network 118-1, and a handover process is performed. Further, in the state of 212 and in a situation where both the Wi-Fi coverage 204 and the cellular coverage 206 is "bad," the RAT preference is to the Wi-Fi telecommunication network 118-2, and no handover process is performed. More regarding the manner in which a handover process is or is not performed between the cellular telecommunication network 118-1 and the Wi-Fi telecommunication network 118-2, and vice versa.

Figure 3:
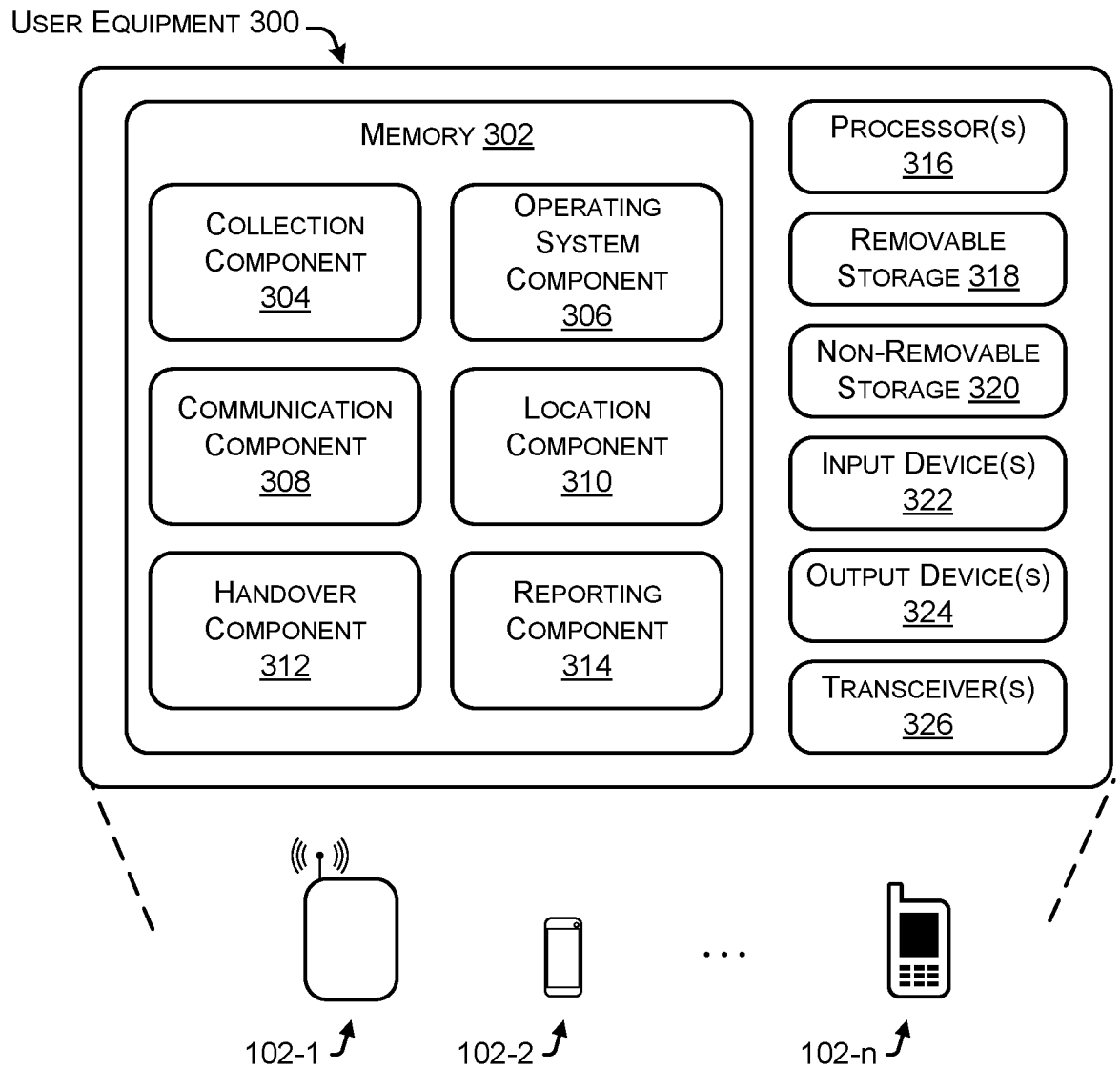
FIG. 3 is a block diagram illustrating an example UE, according to an example of the principles described herein.

FIG. 3 is a block diagram illustrating an example UE 300, according to an example of the principles described herein. The UE 300 is configured to implement the collection component 104, in accordance with examples of the disclosure. In the descriptions provided herein, the UE 300 may correspond to the UE(s) 102 of FIG. 1 and the UE(s) 102 of FIG. 1 may correspond to the UE 300. In the context of this disclosure, the UE 300 may be implemented as a single device or as a plurality of devices with components and data distributed among them. By way of example, and without limitation, the UE 300 may be implemented as various UE(s) 102(A), 102(B), . . . , 102(n), where n is any integer greater than or equal to 1.

As illustrated, the UE 300 comprises a memory 302 storing a collection component 304, an operating system component 306, a communication component 308, a location component 310, a handover component 312, and a reporting component 314. Also, the UE 300 may include a number of processor(s) 316, a removable storage 318, a non-removable storage 320, a number of input device(s) 322, a number of output device(s) 324, and a number of transceiver(s) 326.

In various examples, the memory 302 is volatile (such as RAM), non-volatile (such as ROM, flash memory, etc.) or some combination of volatile and non-volatile memory. The collection component 304, the operating system component 306, the communication component 308, the location component 310, the handover component 312, and the reporting component 314 stored in the memory 302 may comprise methods, threads, processes, applications, or any other sort of executable instructions. The collection component 304, the operating system component 306, the communication component 308, the location component 310, the handover component 312, and the reporting component 314 may also include files and databases.

The memory 302 may include a computer readable medium, a computer readable storage medium, or a non-transitory computer readable medium, among others. For example, the memory 302 may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

In one example, the collection component 304 may correspond to the collection component 104 of FIG. 1. The collection component 304 may include functionality to determine one or more device diagnostic data 124 associated with a signal received, detected, or otherwise monitored by the UE 300. For example, the collection component 304 may determine metrics including but not limited to network coverage, network types, and the like as described herein. In one example, information may be associated with the metrics, such as a band number, channel number, and block identifier, and the among other metrics.

In one example, the collection component 304 may scan a frequency resource at any regular or irregular interval or may initiate a scan based on an internal or external trigger or command. For example, the collection component 304 may receive an instruction from a remote network device to initiate a scan. In one example, the collection component may determine operating conditions or characteristics of the UE 300 (e.g., a power resource, location, network connection capabilities, etc.), and a command to initiate scanning may be based at least in part on those operating conditions or characteristics. In one example, the collection component 304 may include previously-collected measurements. According to some examples, the collection component 304 may sample conditions of a signal over a period of time and perform a statistical analysis to determine additional metrics (e.g., average, median, high, low, etc.) associated with the signal.

The collection component 304 may be implemented as an application operating on the UE 300. In one example, to initiate a scan of one or more frequency resources, the collection component 304 may call an application programming interface (API) implemented in the operating system component 306.

In one example, the collection component 304 may include functionality to present a user interface on the UE 300, for example, to receive an indication from a user enabling or disabling a collection component mode of the collection component 304. In one example, a user of the UE 300 may turn on or turn off the collection component 304 based on personal preferences, incentives from a service provider, and inclusion in a voluntary program, among other reasons.

The operating system component 306 may include functionality to query a chipset of the UE 300, and/or to query the transceiver(s) 326, to instruct the transceiver(s) 326 and/or any software or hardware to scan one or more channels or frequency resources to determine metrics associated with the channel or frequency resources of the cellular telecommunication network 118-1 and/or the Wi-Fi telecommunication network 118-2, for example. In one example, the operating system component 306 may include a first API to receive instructions from the collection component 304 and to provide data to the collection component 304, and a second API to issue instructions to software or hardware associated with a modem or the transceiver(s) 326 and to receive data from such components.

The communication component 308 may include functionality to conduct communications with one or more other devices, as described herein. Further, the communication component 308 may include functionality to conduct communications via the cellular telecommunication network 118-1 and/or the Wi-Fi telecommunication network 118-2. In one example, the communication component 308 may conduct a communication via a first set of frequency resources, while the collection component 304 may analyze a second set of frequency resources. In one example, at least a portion of the first set and the second set of frequency resources may be overlapping, and in some examples, the first set and the second set of frequency resources may be independent.

According to some examples, the communication component 308 may take priority over resources of the UE 300 to conduct a communication. That is, if the collection component 304 initiates a scan of a frequency resource, and if the communication component 308 subsequently initiates a communication using the frequency resource or another frequency resource, the communication component 308 may initiate the communication by interrupting the collection component 304. Other prioritization schemes may be used, and the communication component 308 may have any relative or absolute priority level.

The location component 310 may include functionality to determine a location of the UE 300. In on example, the location component 310 may determine a location based at least in part on GPS location data, base station identity, Wi-Fi access point identity, other location sources, and a combination thereof. In one example, a location may include a mobile network code (MNC) and a mobile country code (MCC) used in combination to uniquely identify a mobile network carrier network. In an example, the location component 310 may determine a base station or cell identity, and/or latitude, longitude, altitude information, and timestamp information. In an example, the location may be determined in connection with determining one or more metrics associated with a signal or channel of the cellular telecommunication network 118-1 and/or the Wi-Fi telecommunication network 118-2. In one example, the location may be provided to a network device such as the network device(s) 112 of FIG. 1. In one example, the location component 310 may determine a location of the UE 300 relative to a location of a geofenced location. For example, the location component 310 may receive a geofenced location from a network device.

The handover component 312 may include functionality to aggregate data associated with the UE 300, including one or more of the device diagnostic data 124 described with respect to FIG. 1. For example, the handover component 312 may evaluate RSSI, RSRP, MCC, MNC, network type information, location information received from the location component 310, and time and/or date information, among other device diagnostic data 124. The handover component 312 stores the device diagnostic data 124 in the removable storage 318 and/or the non-removable storage 320.

One or more triggering events may cause the UE 300 to transmit the data by retrieving the metrics from the removable storage 318 and/or the non-removable storage 320 and transmitting the data via the transceiver(s) 326 to the network device(s) 112.

The reporting component 314 may include functionality to store one or more device diagnostic data 124 associated with one or more frequency resources and to send such metrics to a network device. In one example, the reporting component 314 may send the one or more metrics to a network device as the one or more metrics are generated, captured, or determined. In one example, the reporting component 314 may send the metrics to the network device 112 of FIG. 1. In one example, the reporting component 314 may send the metrics based on a connection type of the UE 300 (e.g., when the UE 300 is connected to a Wi-Fi network). In one example, the reporting component 314 may send the metrics at a time of low network congestion (e.g., at night). In one example, the reporting component 314 may transmit metrics in response to a query from a network device. In one example, the reporting component 314 may encode the data sent to a network device such that a service provider tracking data usage does not count the data against a quota associated with the UE 300.

The components 304, 306, 308, 310, 312, 314, along with any other components described herein, may include any form of executable code stored within the removable storage 318 and/or non-removable storage 320. Thus, the components 304, 306, 308, 310, 312, 314 are embodied within a computer readable medium, a computer readable storage medium, or a non-transitory computer readable medium, among others. The components 304, 306, 308, 310, 312, 314 are executable via the processor(s) 316. In some examples, the processor(s) 316 is a central processing unit (CPU), a graphics processing unit (GPU), an application specific integrated circuit (ASIC), a chipset, or other integrated circuit or device capable of processing data.

The UE 300 also includes additional data storage devices (removable and/or non-removable) such as, for example, magnetic disks, optical disks, tape, or other forms of data storage devices described herein. Such additional storage is illustrated in FIG. 3 by removable storage 318 and non-removable storage 320. Tangible computer-readable media may include volatile and non-volatile, removable and non-removable media implemented in any method or technology for storage of information, such as computer readable instructions, data structures, program modules, or other data. Memory 302, removable storage 318 and non-removable storage 320 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which may be used to store the desired information and which may be accessed by the UE 300. Any such tangible computer-readable media may be part of the UE 300.

In various examples, the UE 300 may include applications including but not limited to, a web browser application, a video streaming application, an online gaming application, and a collection component, among others. During execution on the UE 300, each of the applications may be configured to cause the UE 300 to initiate data communications with the network device(s) 112 over the network(s) 114.

The UE 300 may be configured to communicate over at least one telecommunications network (e.g., the cellular telecommunication network 118-1 and/or the Wi-Fi telecommunication network 118-2) using any common wireless and/or wired network access technology. Moreover, the UE 102 may be configured to run any compatible device operating system (OS).

The UE 300 also may include input device(s) 322, such as a keypad, a cursor control, a touch-sensitive display, a heads-up display (HUD), and a voice input device, among others. The UE 300 also may include output device(s) 324 such as a display, speakers, printers, and heads-up displays (HUD), among others.

As illustrated in FIG. 3, the UE 300 also includes one or more wired or wireless transceiver(s) 326. For example, the transceiver(s) 326 may include a network interface card (NIC), a network adapter, a LAN adapter, or a physical, virtual, or logical address to connect to various network(s) 114, or to the network device(s) 112. To increase throughput when exchanging wireless data, the transceiver(s) 326 may utilize multiple-input/multiple-output (MIMO) technology. The transceiver(s) 326 may include any type of wireless transceivers capable of engaging in wireless, radio frequency (RF) communication. The transceiver(s) 326 may also include other wireless modems, such as a modem for engaging in Wi-Fi, WiMax, Bluetooth, near-field communication (NFC), and infrared communication, among other wireless communication. In one example, the transceiver(s) 326 may correspond to the transceiver(s) 106 of FIG. 1.

Figure 4:
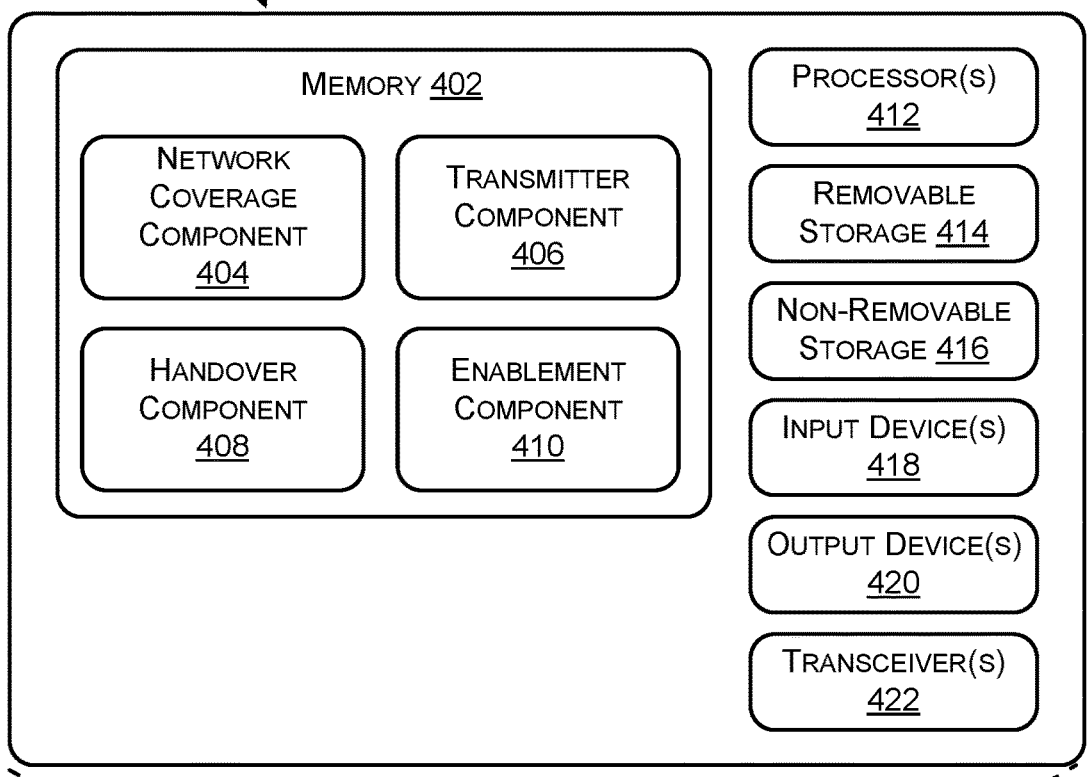
FIG. 4 is a block diagram of a network device, according to an example of the principles described herein.

FIG. 4 is a block diagram of a network device configured to perform a handover process from one type of telecommunications network to another type of telecommunications network, according to an example of the principles described herein. FIG. 4 illustrates an example network device 400 configured to receive device diagnostic data 124 captured by the UE 102. Although UE 102 is used in describing the user equipment on connection with the network device 400 of FIG. 4, the UE 300 of FIG. 3 may also be included as user equipment. In one example, the network device 400 may correspond to the network device(s) 112 of FIG. 1. The network device 400 may be implemented as a single device or as a plurality of devices with components and data distributed among them.

The network device 400 includes a memory 402 storing a network coverage component 404, a transmitter component 406, a handover component 408, and an enablement component 410. Also, the network device 400 includes processor(s) 412, a removable storage 414 and non-removable storage 416, input device(s) 418, output device(s) 420, and transceiver(s) 422.

In various examples, the memory 402 is volatile (such as RAM), non-volatile (such as ROM, flash memory, etc.) or some combination of the two. The network coverage component 404, the transmitter component 406, the handover component 408, and the enablement component 410 stored in the memory 402 may comprise methods, threads, processes, applications or any other sort of executable instructions. The network coverage component 404, the transmitter component 406, the handover component 408, and the enablement component 410 may also include files and databases.

The network coverage component 404 may include functionality to receive one or more device diagnostic data 124 determined and/or captured by the UE 102, as described herein. In one example, the handover component 404 may receive a plurality of device diagnostic data 124 and store the device diagnostic data 124 in a database such as, for example, a database stored by the removable storage 414 and/or non-removable storage 416 or in a data storage device separate from the network device 400. In one example, the device diagnostic data 124 may be indexed by location, time, and UE 102, among other parameters. In one example, the network coverage component 404 may perform any statistical analysis on the device diagnostic data 124 to determine a variety of characteristics associated with the telecommunications network. For example, the network coverage component 404 may determine what wireless access technologies are accessed (e.g., cellular, Wi-Fi, etc.), what the capability is of the UEs 102 operating within the telecommunications network, strengths of signals, and coverage areas associated with different wireless access technologies, among other identifiable characteristics and states.

The transmitter component 406 may identify and store locations of transmitters 110 and/or base stations in a database. Further, the transmitter component 406 may receive location data and/or metrics in the form of the device diagnostic data 124 associated with a signal to determine which transmitter 110 corresponds to the metrics. In one example, the transmitter component 406 may determine a confidence value associated with the identity of a transmitter or base station.

The handover component 408 may include functionality to perform the handover processes described herein. The handover component 408 may utilize the device diagnostic data 124 and at least one threshold to determine when to perform the handover from the cellular telecommunication network 118-1 and the Wi-Fi telecommunication network 118-2 as depicted in FIG. 1, and vice versa. In one example, the network device 400 communicates directly or indirectly with the UE 102 to determine when and under what conditions the handover process is to be executed.

The enablement component 410 may include functionality to send invitations to the UE(s) 102 to determine if users of the UE(s) 102 wish to activate the collection component 104, FIG. 1, as described herein. In one example, the enablement component 410 may enable the collection component 104, FIG. 1 for individual UE 102 based at least in part on characteristics of the UE 102, such as whether an antenna of the UE 102 is configured to receive signals associated with particular frequency resources.

In some examples, the processor(s) 412 is a CPU, a GPU, an ASIC, a chipset, or other integrated circuit or device capable of processing data.

The network device 400 also includes additional data storage devices (removable and/or non-removable) such as, for example, magnetic disks, optical disks, tape, or other forms of data storage devices described herein. Such additional storage is illustrated in FIG. 4 by removable storage 414 and non-removable storage 416. Tangible computer-readable media may include volatile and nonvolatile, removable and non-removable media implemented in any method or technology for storage of information, such as computer readable instructions, data structures, program modules, or other data. Memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by the network device 400. Any such tangible computer-readable media may be part of the network device 400.

The network device 400 may include input device(s) 418, such as such as a keypad, a cursor control, a touch-sensitive display, a heads-up display (HUD), and a voice input device, among others. Also, the network device 400 may include output device(s) 420, such as a display, speakers, printers, heads-up displays (HUD), among others.

As illustrated in FIG. 4, the network device 400 may include one or more wired or wireless transceiver(s) 422. In some wireless examples, to increase throughput, the transceiver(s) 422 may utilize multiple-input/multiple-output (MIMO) technology. The transceiver(s) 422 may be any sort of wireless transceivers capable of engaging in wireless, radio frequency (RF) communication. The transceiver(s) 422 may also include other wireless modems, such as a modem for engaging in Wi-Fi, WiMax, Bluetooth, NFC, and infrared communication, among other wireless communication.

Figure 5:
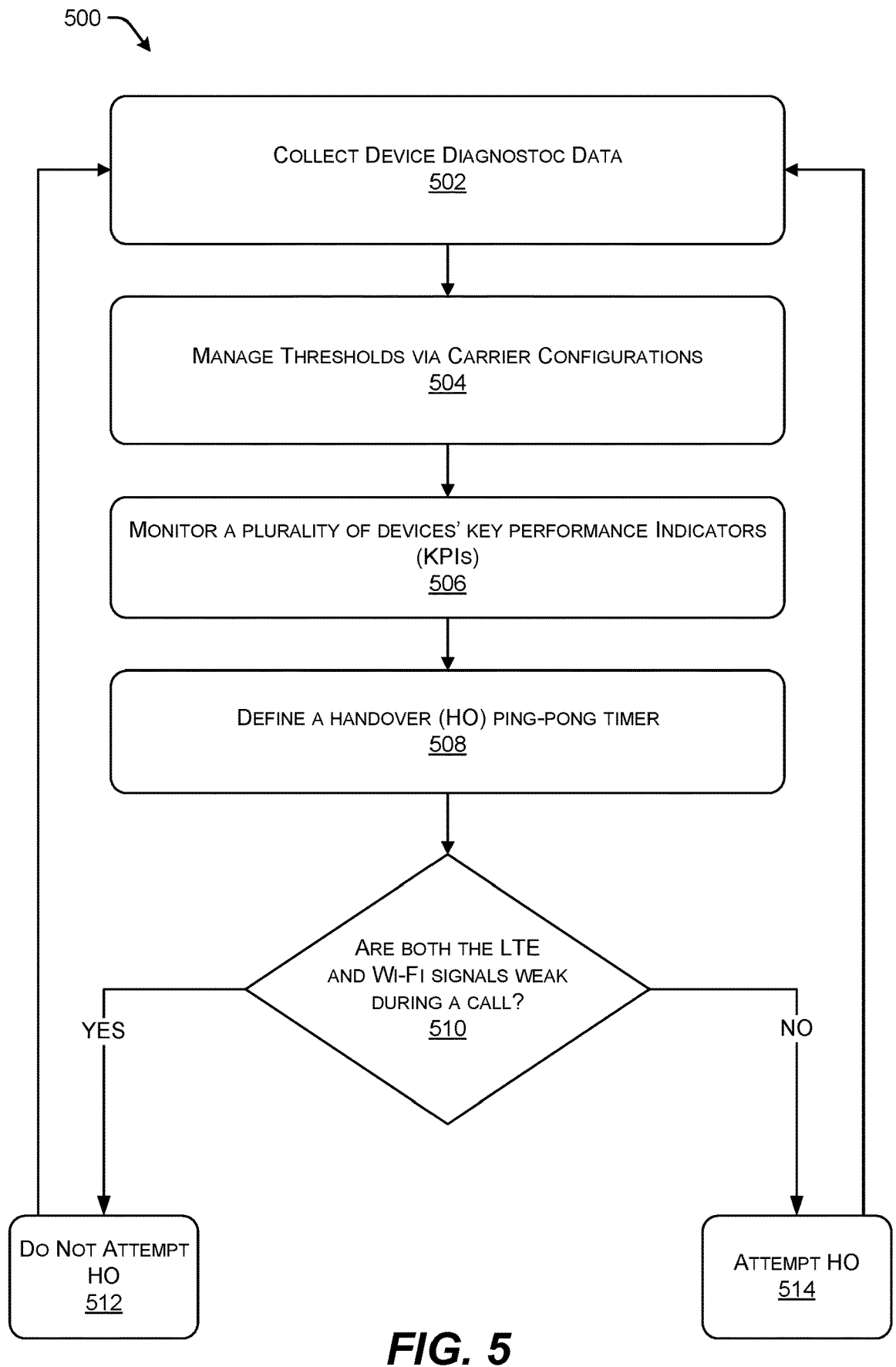
FIG. 5 is a flow diagram of an example process that includes determining whether to handover between two types of telecommunication networks, according to an example of the principles described herein.

FIG. 5 is a flow diagram 500 of an example process that includes determining whether to handover between two types of telecommunication networks, according to an example of the principles described herein. This process is illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Computer-executable instructions include routines, programs, objects, components, and data structures, among other instructions that perform particular functions or implement particular abstract data types. The order in which the operations are described is not intended to be construed as a limitation, and any number of the described operations may be combined in any order and/or in parallel to implement the processes. Further, the processes described in connection with FIG. 5 may be performed by the processor(s) 316 of the EU 102, 300, the processor(s) 412 of the network device 112, 400, and/or another processing device within the environment 100. The processor(s) execute the components of the UE 102, 300 and/or the network device 112, 400 to perform the processes of FIG. 5.

At 502, the device diagnostic data 124 may be collected by the one or more processor(s) 316, 412 of the UEs 102, 300 and/or the network device 112, 400. This collection of the device diagnostic data 124 may take place before connection to one of the cellular telecommunication network 118-1 and/or the Wi-Fi telecommunication network 118-2, during a handover process, during a call or data transfer using one of the cellular telecommunication network 118-1 or the Wi-Fi telecommunication network 118-2, or at any other time defined by device diagnostic data transmission triggers, an event that occurs during the operation of the EU 102, 300, or at any other time convenient or effective to the performance of various telecommunications tasks within the environment 100.

At 504, a number of thresholds may be managed via carrier configurations. The one or more processor(s) 412 may receive, from the UE 300, device diagnostic data 124 associated with a plurality of telecommunications networks 118. The device diagnostic data 124 is utilized to determine when and under what circumstances to perform a handover process(es) between different the wireless access technologies and/or one or more recommendations to do so, as described herein. As described above, the device diagnostic data 124 may include data obtained from an interaction between transmitters 110, 126 and UEs 102 in the mobile device telecommunications network (e.g., the environment 100, as depicted in FIG. 1 including the cellular telecommunication network 118-1 and the Wi-Fi telecommunication network 118-2).

The UE 102 may transmit the data based at least in part on one or more triggering events. For example, the device diagnostic data 124 may be transmitted based at least in part on a user launch or execution of a media application using the UE 102, after a predetermined, designated, and/or user-selected time interval, upon selection of a hard or soft button, upon wakeup, as part of a reset cycle, as part of a power-on cycle, as part of a power-off cycle, upon termination of a running application, any other event that may act as a triggering event, and combinations thereof. In some configurations, launching a particular application may be a triggering event, where opening that application, without regard to the signal status (connected to the network, not connected to the network, threshold RSSI values, RSRP values, etc.) of the signals 108-1, 108-2.

The device diagnostic data 124 may be transmitted from a multitude of user equipment (of which the UE 102 may be a part) and may be aggregated at the network device 400. The network device 400 may receive the device diagnostic data 124 as shown in FIG. 1, from one or more user equipment (e.g., the UE 102). In one example, the network device 400 may receive device diagnostic data 124 from a multitude of network devices 112, FIG. 1, which may be tens, hundreds, or more devices that operate within a particular geographic region or within a particular communications network. Accordingly, receiving the data may include receiving a plurality of different device diagnostic data 124 from a plurality of devices, where the data may be received in one or more aggregated or individual transmissions that include a plurality of call data, application activity, and other metrics for each respective UE 102, over a period of time.

The carrier configurations at 504 may be used to manage the thresholds for a particular telecommunications network carrier, a particular OEM, a particular make and/or model of the UE 102, and other particulars regarding the UEs 102, 300. The carrier configurations at 504 are defined by the device diagnostic data 124. In one example, the carrier configurations including the thresholds may be included as part of a Carrier Config file stored within a data storage device of the UE 102, 300 (e.g., memory 302, removable storage 318, and/or non-removable storage 320), within storage device(s) (not shown) associated with the telecommunications networks 118, within a data storage device of the network device 112, 400 and/or another data storage device.

The Carrier Config file may include other data such as, for example, mobile data including an access point name (APN), a username, a password, a mobile country code (MCC), a mobile network code (MNC), and an authentication type, among other mobile data. Further, the Carrier Config file may include other data such as, for example, multimedia messaging service (MMS) data including an APN, a username, a password, an identification of an MMS Center (MMSC), an identification of an MMS-Proxy, an identification of an MMS-Port, an MCC, an MNC, an authentication type, a maximum message size, among other MMS data.

The Carrier Config file may be updated by the telecommunications network carrier by, for example, pushing the update, periodically sending updates to the UE 102, or allowing a user to request the update. Allowing the Carrier Config file of the UE 102 to be updated with data defining the threshold(s) avoids maintenance releases (MRs) and software updates for the UEs 102, 300 to be pushed to each UE 102, 300. This increases the speed at which the thresholds may be updated and provides a more dynamic adjustment of the thresholds based on the device diagnostic data 124. Further, the use of the Carrier Config file in updating the thresholds may be performed in the background as other programs or applications are executed on the UE 102, 300.

Each OEM of the UEs 102, 300 may set their respective threshold(s) for handover processing differently, and those threshold(s) may not be set to an optimal value. Further, different makes and/or models of UEs 102, 300 may include different handover thresholds as defined by their respective Carrier Config files. Still further, different retail sellers of the UEs 102, 300 may include Carrier Config files with differing threshold values. Despite these differences, the Carrier Config files may be used to dynamically set or define the thresholds used to perform the handover processes based on the device diagnostic data 124 obtained. In one example, the dynamic updating of the thresholds may be performed irrespective and/or independent of original thresholds set by an OEM, a telecommunications network provider, or other entity. As an example, a UE 102, 300 may experience a change in a DCR, a QoS, a handover rate, or other metric while being communicatively coupled to the cellular telecommunication network 118-1 or the Wi-Fi telecommunication network 118-2. In this instance, the threshold values may be adjusted accordingly and updated within the Carrier Config file.

Further, the Carrier Config file for the individual UEs 102, 300 may be updated to include updated thresholds based on the device diagnostic data 124 collected by the collection component 304. If it is determined that the thresholds for a first UE 102 is not optimal, then the Carrier Config file may be used as a platform to adjust the threshold(s) used to perform the handover processing. The thresholds may be updated within the Carrier Config file based on the device diagnostic data 124, and transmitted to the UE 102, 300 as an update within the Carrier Config file.

At 506, after the network device 112, 400 and/or the UE 102, 300 receives the device diagnostic data 124 and the thresholds are managed via the carrier configurations, the one or more processor(s) 316, 412 of the UEs 102, 300 and/or the network device 112, 400 may monitor a plurality of key performance indicators (KPIs) associated with different wireless access technologies to determine if a handover process should be performed. As described above, the handover component 404 may determine what UEs 102 have connected to different wireless access technologies, as well as what UEs 102 have the capability to and are connected to the different wireless access technologies. The KPIs of the UEs 102, 300 may be monitored to determine when thresholds have been reached or exceeded. The KPIs considered may include any of the device diagnostic data 124 described herein.

At 508, the one or more processor(s) 412 may define, using the handover component 312 of the UE 102, 300, the handover component 404 of the network device 112, 400, or some other component, within the overall environment 100, the ping-pong timer(s) associated with the handover processes described herein. A ping-pong effect may occur as a plurality of handovers between, for example, the cellular telecommunication network 118-1 and the Wi-Fi telecommunication network 118-2 occur over a relatively short period of time. A ping-pong effect may have serious effects on the telecommunication networks 118 causing system instability, call drop rate increases, and quality of service (QoS) degradation due to unnecessary increases in handover event. Therefore, in the examples described herein, a ping-pong timer (e.g., PPTimer_HO) is included within, for example, the carrier configurations (e.g., the Carrier Config file) to define a time period between attempts to perform a handover process. In one example, the ping-pong timer may include a default period of 10 seconds as indicated at 508. In one example, the ping-pong timer may be adjusted from a default value or a previous value based on subsequent device diagnostic data 124 obtained. When a handover process is commenced, the processor(s) 316 of the EU 102, 300 and/or the processor(s) 412 of the network device 112, 400 may begin the ping-pong timer countdown. If and when the ping-pong timer expires, the processor(s) 316 of the EU 102, 300 and/or the processor(s) 412 of the network device 400 may complete the handover process from one of the cellular telecommunication network 118-1 or the Wi-Fi telecommunication network 118-2 to the other.

As mentioned herein, the default for the ping-pong timer may be ten seconds. In some legacy implementations, a ping-pong timer may be set to 120 seconds. An initial ten second ping-pong timer is set in order to be aligned with LAN handover timers associated with LAN telecommunication devices included in, for example, the Wi-Fi telecommunication network 118-2. This initial ten second ping-pong timer allows for the switching from the cellular telecommunication network 118-1 to the Wi-Fi telecommunication network 118-2, and visa versa, without increasing a drop call rate or the user observing a decrease in QoS such as lapses in audio feeds, muted audio feeds, lost data transfers, slowed data transfers, among other QoS factors.

The value of the ping-pong timer value (e.g., PPTimer_HO value) may be dynamically adjusted as the device diagnostic data 124 is collected at block 502 and the thresholds are managed via the carrier configurations at block 504. Thus, as the UEs 102 are used within the cellular telecommunication network 118-1 and the Wi-Fi telecommunication network 118-2, the collected device diagnostic data 124 is used to determine whether and by how much to adjust the ping-pong timer value.

At 510, it is determined whether both the signals 108-1, 108-2 from the cellular telecommunication network 118-1 and the Wi-Fi telecommunication network 118-2 are weak during a call or data transmission. Here, "weak" may be defined as dropping below a threshold or a series of thresholds. The thresholds are described in more detail in connection with FIGS. 6A and 6B.

If both the signals 108-1, 108-2 from the cellular telecommunication network 118-1 and the Wi-Fi telecommunication network 118-2 are not weak as to the threshold(s), then a handover process may occur as indicated at 514. Thus, if the UE 102 is communicatively coupled to one of the cellular telecommunication network 118-1 or the Wi-Fi telecommunication network 118-2, and the one of the telecommunication networks to which the UE 102 is communicatively coupled is weak (e.g., is below the threshold(s)) and the one of the telecommunication networks to which the UE 102 is not communicatively coupled is not weak (e.g., is above the threshold(s)), then a handover process may be completed at 514 such that the UE 102 is disconnected from the weak telecommunication network, and communicatively coupled to the non-weak telecommunication network.

However, if both the signals 108-1, 108-2 from the cellular telecommunication network 118-1 and the Wi-Fi telecommunication network 118-2 are weak and are below the threshold(s), then a handover process is not attempted as indicated at 512. In this instance, better QoS and DCRs may be obtained by not switching from a weak telecommunication network to another weak telecommunication network. More regarding the plurality of thresholds and the role of the thresholds serve in a handover process will now be described in connection with FIGS. 6A and 6B.

Further, once the determination at 510 is performed and the handover is attempted at block 514 or not attempted at block 512, the method 500 may return to block 502 where additional device diagnostic data is collected. In this manner, nay number of iterations of collection of device diagnostic data 502, management of thresholds 504, monitoring of KPIs 506, defining of handover ping-pong timers 508, and determining whether to attempt a handover 510, 512, 514 may be performed. In each iteration, the thresholds and/or ping-pong timers may be adjusted based on the device diagnostic data obtained at 502 within that iteration. In this manner, the systems and methods described herein provide for an iterative process of determining optimal thresholds and ping-pong timers for a UE 102 within the environment 100. Thus, the systems and methods described herein improve dropped-call rates and minimize fixes to software releases by allowing for the continual and iterative optimization of the thresholds and ping-pong timers and does so for individual OEMs that may be optimized in this manner differently.

Figure 6A:
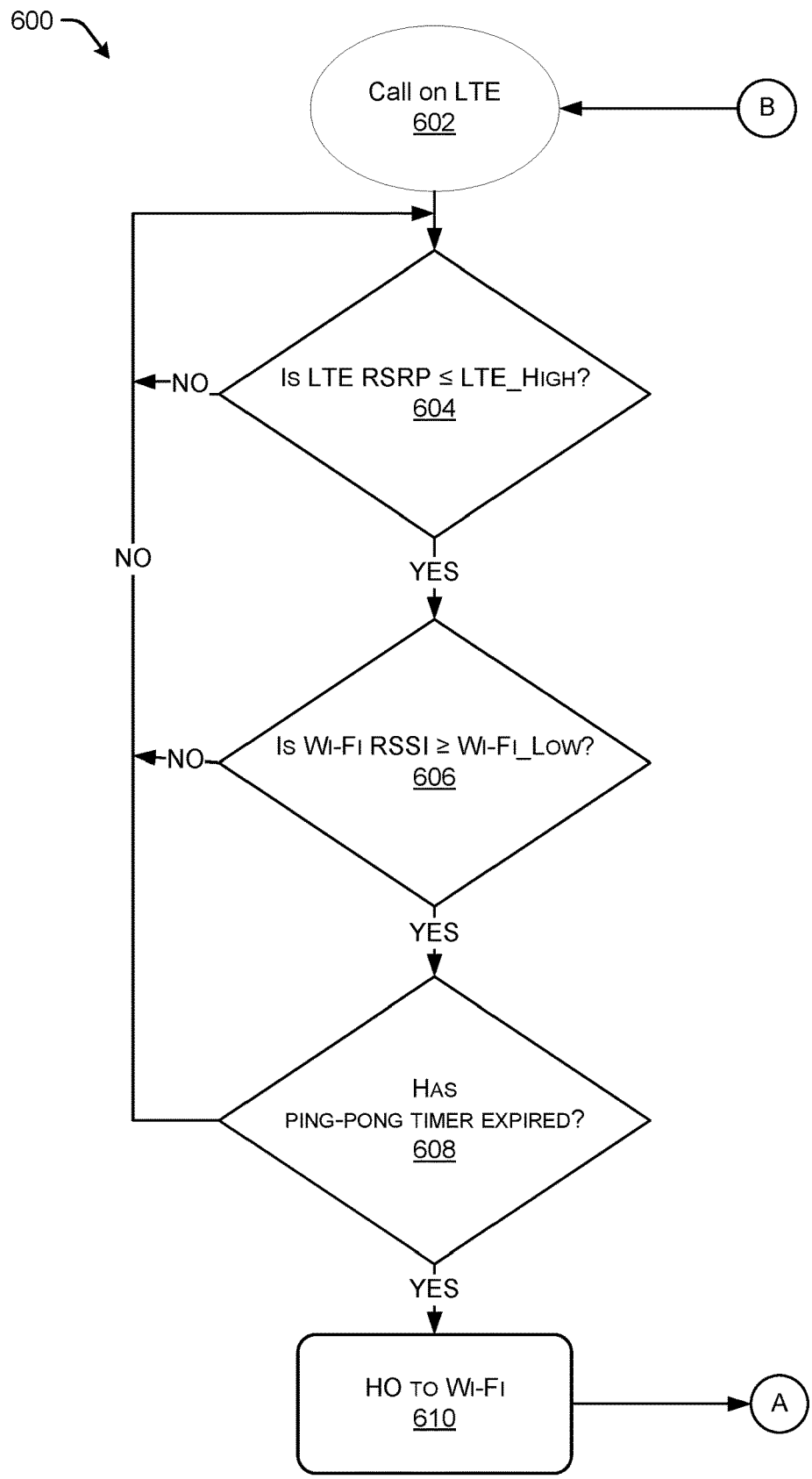
FIGS. 6A and 6B depict a flow diagram of an example process that includes determining whether to handover between two types of telecommunication networks, according to an example of the principles described herein.
Figure 6B:
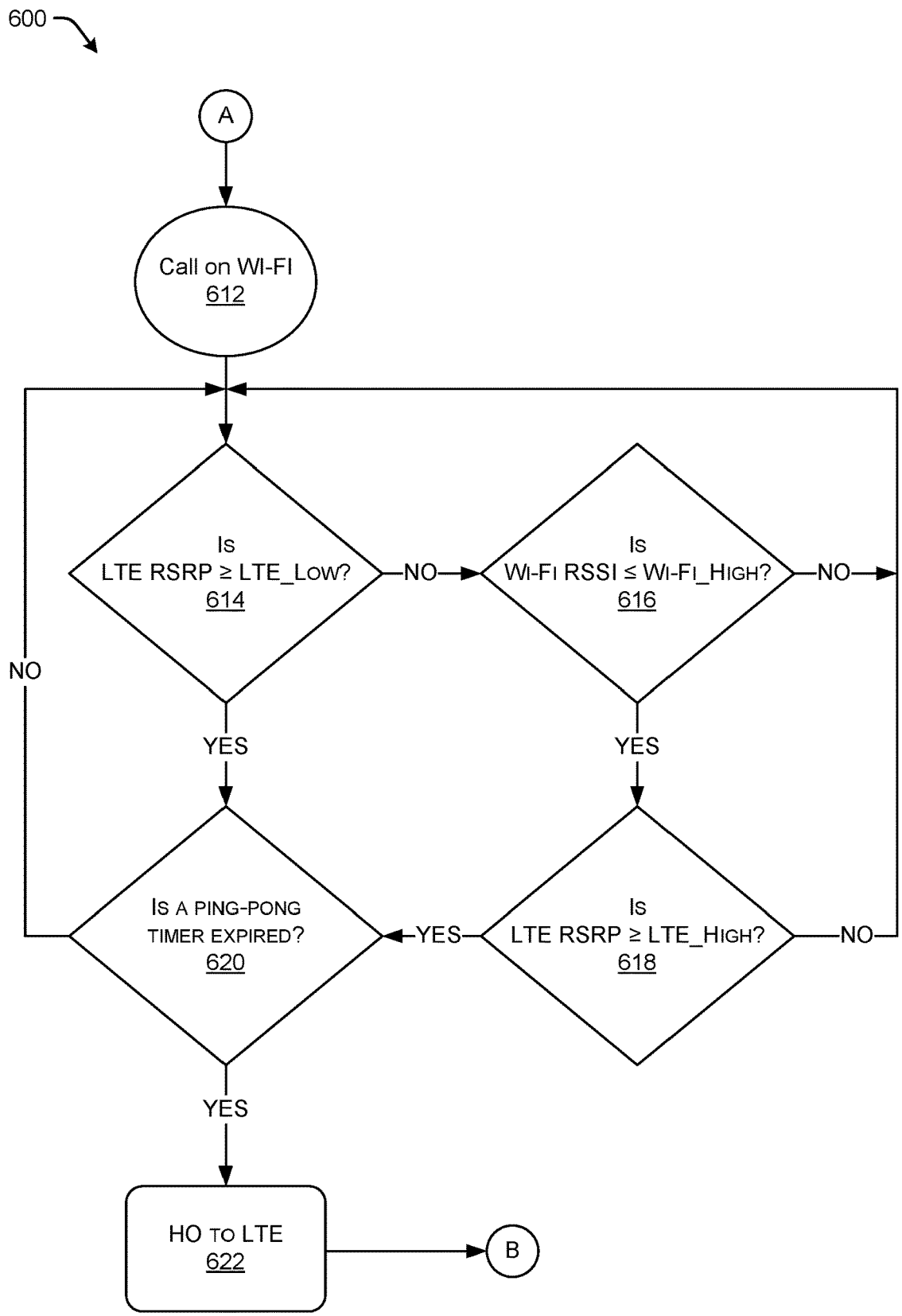

FIGS. 6A and 6B depict a flow diagram 600 of an example process that includes determining whether to handover between two types of telecommunication networks, according to an example of the principles described herein. In particular, FIG. 6A depicts an example process that includes determining whether to handover from a cellular telecommunication network 118-1 (e.g., an LTE network) to a Wi-Fi telecommunication network 118-2. Similarly, FIG. 6B depicts an example process that includes determining whether to handover from a Wi-Fi telecommunication network 118-2 to a cellular telecommunication network 118-1 (e.g., an LTE network).

This process of FIGS. 6A and 6B is illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Computer-executable instructions include routines, programs, objects, components, and data structures, among other instructions that perform particular functions or implement particular abstract data types. The order in which the operations are described is not intended to be construed as a limitation, and any number of the described operations may be combined in any order and/or in parallel to implement the processes. Further, the processes described in connection with FIGS. 6A and 6B may be performed by the processor(s) 316 of the EU 102, 300, the processor(s) 412 of the network device 112, 400, and/or another processing device within the environment 100. The processor(s) execute the components of the UE 102, 300 and/or the network device 112, 400 to perform the processes of FIGS. 6A and 6B.

Regarding the thresholds described herein, the LTE_High threshold may include a value of approximately −114 dBm, and this value may be the default LTE_High value. In legacy systems, the LTE_High threshold value may be approximately −119 dBm. Similarly, the LTE_Low threshold may include a value of approximately −109 dBm, and this value may be the default LTE_Low value. In legacy systems, LTE_Low threshold value may be approximately −112 dBm. The legacy values used in previous systems are static values that may not address issues related to call dropped rates, QoS issues, and other performance issues within the environment 100 and the cellular telecommunication network 118-1 and/or the Wi-Fi telecommunication network 118-2.

In contrast, the LTE_High threshold value and the LTE_Low threshold value described herein are dynamically adjusted based on the telecommunications networks' performance. In this manner, the QoS is increased and the DCR is decreased as the dynamic threshold values change for the telecommunications networks based on the device diagnostic data 124. Further, the Wi-Fi thresholds may be set to a default values where Wi-Fi_High is approximately −80 dBm and Wi-Fi_Low is approximately −70 dBm were not changed. Like the LTE threshold values, the Wi-Fi threshold values may be dynamically adjusted based on the device diagnostic data 124.

These LTE and Wi-Fi threshold vales are set at these defaults and allowed to dynamically adjust in order to sufficiently hold the call and maintain the call without unnecessary handover processes being performed. Further, in legacy systems, a single logic is applied to every UE 102, 300 irrespective of how those individual UEs 102, 300 perform within the telecommunications networks. Because different UEs 102, 300 are manufactured by different OEMs, are different makes and models of mobile devices, have different chipsets, have different RF antennas, and include other differences, it is clear that a single logic to determine handover processing may not result in a best QoS, DCR, or other performance metric for a particular UE 102, 300.

At 602, a call may be initiated via an LTE network such as the cellular telecommunication network 118-1. The process for determining whether to perform a handover may be continually or periodically executed. At 604, the process may include determining whether a value for an LTE RSRP is less than or equal to a first threshold. Here, the first threshold is an LTE_High value. As mentioned herein, the LTE_High value is set at an initial default value of approximately −114 dBm. In response to a determination that the LTE RSRP value is not less than or equal to the first threshold (604, determination NO), the process may loop to before 604 for the determination at 604 may be made again.

If, instead, the LTE RSRP value is less than or equal to the first threshold (604, determination YES), the process continues to 606, where it is determined whether the value of a Wi-Fi RSSI value is greater than or equal to a second threshold. Here, the second threshold is a Wi-Fi_Low value. As mentioned herein, the Wi-Fi_Low value is set at an initial default value of approximately −109 dBm. In response to a determination that the Wi-Fi RSSI value is not greater than or equal to a second threshold (606, determination NO), the process may loop to before 604 for the determination at 604 may be made again.

However, in response to a determination that Wi-Fi RSSI value is greater than or equal to a second threshold (606, determination YES), the process may continue to 608 where a determination is made as to whether the ping-pong timer has expired. As mentioned herein, the ping-pong timer has a default value of 10 seconds and may dynamically adjust based on the device diagnostic data 124. In response to a determination that the ping-pong timer has not expired (608, determination NO), the process may loop to before 604 for the determination at 604 may be made again. In one example, instead of the process looping to before 604, the process may loop to before 608 to wait for the ping-pong timer to expire.

However, in response to a determination that the ping-pong timer has expired (608, determination YES), the process may include, at 610, performing a handover process to transfer the ongoing call, data session, or data transfer performed via the cellular telecommunication network 118-1 to the Wi-Fi telecommunication network 118-2. In this process outlined in FIG. 6A, the handover process is performed only if the Wi-Fi telecommunication network 118-2 has an effective received signal strength higher than at least the Wi-Fi_Low value in instances where the LTE RSRP value has dropped below the LTE_High value.

The process of FIGS. 6A and 6B may continue to the processes of FIG. 6B via designation "A." In FIG. 6B it is assumed that an ongoing call, data session, or data transfer was initiated on the Wi-Fi telecommunication network 118-2 or was transferred from a call, data session, or data transfer initiated on the cellular telecommunication network 118-1 as outlined above in connection with FIG. 6A. Thus, the process of FIG. 6B begins with the ongoing call, data session, or data transfer being executed via the Wi-Fi telecommunication network 118-2.

At 614, it is determined whether a value for an LTE RSRP is greater than or equal to a third threshold. Here, the third threshold is an LTE_Low value. As mentioned herein, the LTE_Low value is set at an initial default value of approximately −109 dBm. In response to a determination that the LTE RSRP is not greater than or equal to a third threshold (614, determination NO), it is determined at 616 whether the Wi-Fi RSSI value is less than or equal to the fourth threshold (e.g., Wi-Fi_High). In response to a determination that the Wi-Fi RSSI value is not less than or equal to the fourth threshold (e.g., Wi-Fi_High) (616, determination NO), the process may loop to before 614 for the determination at 614 may be made again.

In response to a determination that the Wi-Fi RSSI value is less than or equal to the fourth threshold (e.g., Wi-Fi_High) (616, determination YES), it is determined at 618 whether a value for the LTE RSRP is greater than or equal to the first threshold (e.g., LTE_High). In response to a determination that the LTE RSRP value is not greater than or equal to the first threshold (e.g., LTE_High) (618, determination NO), the process may loop to before 614 for the determination at 614 may be made again.

However, in response to a determination that the LTE RSRP value is greater than or equal to the first threshold (e.g., LTE_High) (618, determination NO), the process may continue to 620 where a determination is made as to whether the ping-pong timer has expired. Again, as mentioned herein, the ping-pong timer has a default value of 10 seconds and may dynamically adjust based on the device diagnostic data 124. In response to a determination that the ping-pong timer has not expired (620, determination NO), the process may loop to before 614 for the determination at 614 may be made again. In one example, instead of the process looping to before 614, the process may loop to before 620 to wait for the ping-pong timer to expire.

However, in response to a determination that the ping-pong timer has expired (620, determination YES), the process may include performing a handover process to transfer the ongoing call, data session, or data transfer performed via the Wi-Fi telecommunication network 118-2 to the cellular telecommunication network 118-1 at 622. In this process outlined in FIG. 6B, the handover process is performed only if the cellular telecommunication network 118-1 has an effective received signal strength higher than at least the LTE_High value in instances where the Wi-Fi RSSI value has dropped below the Wi-Fi_High value and the LTE RSRP value is at least as high as the LTE_Low value.

Turning again to 614, in response to a determination that the LTE RSRP is not greater than or equal to a third threshold (614, determination YES), the process may continue to 620 where a determination is made as to whether the ping-pong timer has expired as described above. Thus, in instances where the LTE RSRP value has dropped below the LTE_Low value, a handover process may be executed assuming the ping-pong timer has expired.

The process of FIGS. 6A and 6B may continue to the processes of FIG. 6A via designation "B." As mentioned above, in FIG. 6A it is assumed that an ongoing call, data session, or data transfer was initiated on the cellular telecommunication network 118-1 or was transferred from a call, data session, or data transfer initiated on the Wi-Fi telecommunication network 118-2 as outlined above in connection with FIG. 6B. Thus, the process of FIG. 6A begins with the ongoing call, data session, or data transfer being executed via the cellular telecommunication network 118-1.

With reference again to FIG. 2 along with FIGS. 6A and 6B, the Wi-Fi initiated calls 212 includes an instance in the last row where the signals 108-1, 108-2 from the cellular telecommunication network 118-1 and the Wi-Fi telecommunication network 118-2 are indicated as being "bad" or below a threshold where the CDR increases, the QoS decreases, a handover rate increases, or some other metric effecting the communications between the UE 102, 300 and the cellular telecommunication network 118-1 and the Wi-Fi telecommunication network 118-2. In this instance, a call initiated via the Wi-Fi telecommunication network 118-2 will not be transferred via the handover process to the cellular telecommunication network 118-1, but will, instead, remain communicatively coupled to the Wi-Fi telecommunication network 118-2 based on the processing provided by FIGS. 6A and 6B.

In the description herein, the use of the phrase "greater than or equal to" may be equivalent to the phrase "at least as high as," and the phrase "less than or equal to" may be equivalent to the phrase "at least as low as."

Aspects of the present systems, devices, and methods are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor(s) 316 of the EU 102, 300, the processor(s) 412 of the network device 112, 400, or other programmable data processing apparatus within the environment 100, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Examples described herein provide a user equipment (UE) for handover processes between communication networks. The UE includes one or more processors, and one or more non-transitory computer-readable media storing instructions that when executed by the one or more processors, cause the UE to receive, by the UE, first diagnostic information, determine whether to perform a first handover from a first communication network to a second communication network based on a first set of thresholds, the first set of thresholds being based on the first diagnostic information, receive, by the UE, an update of the first diagnostic information, and determine whether to perform a second handover from the first communication network to the second communication network based on an updated first set of thresholds, the updated first set of thresholds being based on the updated first diagnostic information.

The UE further includes instructions to, when executed by the one or more processors, cause the UE to receive, by the UE, second diagnostic information, determine whether to perform a third handover from the second communication network to the first communication network based on a second set of thresholds, the second set of thresholds being based on the second diagnostic information, receive, by the UE, an update of the second diagnostic information, and determine whether to perform a fourth handover from the second communication network to the first communication network based on an updated second set of thresholds, the updated second set of thresholds being based on the updated second diagnostic information.

The first set of thresholds and the updated first set of thresholds includes a first threshold associated with a reference signals received power (RSRP) value, a second threshold associated with a received signal strength indicator (RSSI) value, and a first ping-pong timer value. The first handover and the second handover is performed in response to the RSRP value being at least less than the first threshold, the RSSI value being at least greater than the second threshold, and the first ping-pong timer value having expired. In response to a determination that the RSRP value and the RSSI value are the same in the first handover and the second handover and the first set of thresholds are different from the updated first set of thresholds, the method includes performing the second handover.

The second set of thresholds and the updated second set of thresholds include a third threshold associated with the RSRP value, a fourth threshold associated with the RSSI value, and a second ping-pong timer value. The third handover and the fourth handover are performed in response to the RSRP value being at least greater than the third threshold, the RSSI being at least less than the fourth threshold, the RSRP being at least greater than the first threshold, and the second ping-pong timer value having expired. In response to a determination that the RSRP value and the RSSI value are the same in the third handover and the fourth handover and the second set of thresholds are different from the updated second set of thresholds, the method further includes performing the fourth handover.

The first threshold is a first wireless broadband communication network threshold, the second threshold is a first IEEE 802.11 standard communication network threshold, the third threshold is a second wireless broadband communication network threshold of a lower value relative to the first wireless broadband communication network threshold, and the fourth threshold is a second IEEE 802.11 standard communication network threshold of a higher value relative to the first IEEE 802.11 standard communication network threshold.

The UE further includes instructions to, when executed by the one or more processors, cause the UE to set at least one of the first ping-pong timer value and the second ping-pong timer value at a default value of 10 seconds. The UE further includes instructions to, when executed by the one or more processors, cause the UE to adjust a length of the first ping-pong timer value based on the updated first diagnostic information, and adjust a length of the second ping-pong timer value based on the updated second diagnostic information.

At least one of the first diagnostic information, the updated first diagnostic information, the second diagnostic information, the updated diagnostic information, first ping-pong timer value, and the second ping-pong timer value are received by the UE via a carrier config file. The first communication network is a wireless broadband communication network, and the second communication network is an IEEE 802.11 standard communication network.

Examples described herein also provide a method including receiving, by a user equipment (UE), first diagnostic information associated with a first communication network. The first diagnostic information includes first data defining a first reference signals received power (RSRP) value, and second data defining a first received signal strength indicator (RSSI) value. The method also includes defining a first ping-pong timer value for the first communication network based on the first diagnostic information, and determining whether to perform a first handover from the first communication network to a second communication network in response to the RSRP value being at least less than a first threshold, the RSSI value being at least greater than a second threshold, and the first ping-pong timer value having expired. The method also includes receiving, by the UE, updated first diagnostic information, the updated first diagnostic information defining at least one of an updated first threshold, an updated second threshold, and an updated first ping-pong timer value, and determining whether to perform a second handover from the first communication network to the second communication network based on the updated first diagnostic information.

In response to a determination that the RSRP value and the RSSI value are the same in the first diagnostic information and the updated first diagnostic information, and at least one of the first threshold, the second threshold, and the first ping-pong timer value are different from the updated first threshold, the updated second threshold, and the updated first ping-pong timer value, respectively, performing the second handover.

The method further includes receiving, by the UE, second diagnostic information associated with a second communication network. The second diagnostic information includes third data defining a second RSRP, and fourth data defining a second RSSI. The method further includes defining a second ping-pong timer value for the second communication network based on the second diagnostic information. The method further includes determining whether to perform a third handover from the second communication network to the first communication network in response to the RSRP being at least greater than a third threshold, the RSSI being at least less than a fourth threshold, the RSRP being at least greater than the first threshold, and the second ping-pong timer value having expired. The method also includes receiving, by the UE, updated second diagnostic information, the updated second diagnostic information defining at least one of an updated third threshold, an updated fourth threshold, and an updated second ping-pong timer value, and determining whether to perform a fourth handover from the second communication network to the first communication network based on the updated second diagnostic information.

In response to a determination that the RSRP value and the RSSI value are the same in the second diagnostic information and the updated second diagnostic information, and at least one of the third threshold, the fourth threshold, and the second ping-pong timer value are different from the updated third threshold, the updated fourth threshold, and the updated second ping-pong timer value, respectively, the method also includes performing the fourth handover. The method further includes adjusting a length of the first ping-pong timer value based on the updated first diagnostic information, and adjusting a length of the second ping-pong timer value based on the updated second diagnostic information.

Examples described herein also provide a non-transitory computer-readable medium storing instructions that, when executed, cause one or more processors to perform operations, including receiving, by a user equipment (UE), first diagnostic information associated with a first communication. The first diagnostic information includes first data defining a first reference signals received power (RSRP) of a first communication network, and second data defining a first received signal strength indicator (RSSI) of a second communication network. The non-transitory computer-readable medium further includes operations to define a first ping-pong timer value for the first communication network based on the RSRP, and perform a first handover from the first communication network to the second communication network in response to the RSRP being at least less than a first threshold, the RSSI being at least greater than a second threshold, and the first ping-pong timer value having expired. The non-transitory computer-readable medium further includes operations to receive, by the UE, second diagnostic information associated with a second communication, wherein the second diagnostic information includes third data defining a second RSRP of the first communication network, and fourth data defining a second RSSI of the second communication network. The non-transitory computer-readable medium further includes operations to define a second ping-pong timer value for the second communication network based on the RSSI, and performing a second handover from the second communication network to the first communication network in response to the RSRP being at least greater than a third threshold, the RSSI being at least less than a fourth threshold, the RSRP being at least greater than the first threshold, and the second ping-pong timer value having expired.

The first threshold is a first wireless broadband communication network threshold, the second threshold is a first IEEE 802.11 standard communication network threshold, the third threshold is a second wireless broadband communication network threshold of a lower value relative to the first wireless broadband communication network threshold, and the fourth threshold is a second IEEE 802.11 standard communication network threshold of a higher value relative to the first IEEE 802.11 standard communication network threshold.

The non-transitory computer-readable medium further includes operations to adjust a length of the first ping-pong timer value based on the first diagnostic information and the second ping-pong timer value based on the second diagnostic information. The first communication network is a wireless broadband communication network, and the second communication network is an IEEE 802.11 standard communication network.

The non-transitory computer-readable medium further includes operations to receive, by the UE, at least third diagnostic information, and adjusting at least one of the first threshold, the second threshold, the third threshold, and the fourth threshold based on the third diagnostic information. The first ping-pong timer value and the second ping-pong timer value are set at a default value of 10 seconds.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A user equipment (UE) for handover processes between communication networks, the UE comprising:
one or more processors; and
one or more non-transitory computer-readable media storing instructions that when executed by the one or more processors, cause the UE to:
receive, by the UE, first diagnostic information;
defining a first ping-pong timer value for a first communication network based on the first diagnostic information;
determine to perform a first handover from the first communication network to a second communication network in response to:
a first reference signals received power (RSRP) value being at least less than a first threshold;
a first received signal strength indicator (RSSI) value information being at least greater than a second threshold; and
the first ping-pong timer value having expired;
receive, by the UE, second diagnostic information;
defining a second ping-pong timer value for the second communication network based on the second diagnostic information;
determining to perform a second handover from the second communication network to the first communication network in response to:
a second RSRP being at least greater than a third threshold, the third threshold different than the first threshold;
a second RSSI being at least less than a fourth threshold;
a second RSRP being at least greater than the first threshold; and
the second ping-pong timer value having expired.

2. The UE of claim 1, further comprising instructions to, when executed by the one or more processors, cause the UE to:
receive, by the UE, an update of the first diagnostic information;
determine to perform a third handover from the first communication network to the second communication network based on an updated first set of thresholds, the updated first set of thresholds being based on the updated first diagnostic information;
receive, by the UE, an update of the second diagnostic information; and
determine to perform a fourth handover from the second communication network to the first communication network based on an updated second set of thresholds, the updated second set of thresholds being based on the updated second diagnostic information.

3. The UE of claim 2,
wherein, in response to a determination that the first RSRP value and the second RSRP value and the first RSSI value and the second RSSI value are the same in the first handover and the second handover, performing the second handover.

4. The UE of claim 2, wherein
the fourth threshold is different than the second threshold.

5. The UE of claim 1, wherein:
the first threshold is a first wireless broadband communication network threshold;
the second threshold is a first IEEE 802.11 standard communication network threshold;
the third threshold is a second wireless broadband communication network threshold of a lower value relative to the first wireless broadband communication network threshold; and
the fourth threshold is a second IEEE 802.11 standard communication network threshold of a higher value relative to the first IEEE 802.11 standard communication network threshold.

6. The UE of claim 1, further comprising instructions to, when executed by the one or more processors, cause the UE to set at least one of the first ping-pong timer value and the second ping-pong timer value at a default value of 10 seconds.

7. The UE of claim 1, further comprising instructions to, when executed by the one or more processors, cause the UE to:
adjust a length of the first ping-pong timer value based on the updated first diagnostic information; and
adjust a length of the second ping-pong timer value based on the updated second diagnostic information.

8. The UE of claim 1, wherein at least one of the first diagnostic information, the updated first diagnostic information, the second diagnostic information, the updated second diagnostic information, first ping-pong timer value, and the second ping-pong timer value are received by the UE via a carrier config file.

9. The UE of claim 1, wherein:
the one or more processors, cause the UE to capture the first diagnostic information associated with the first communication network; and
determining whether to perform the first handover from the first communication network to the second communication network is based on the first diagnostic data information.

10. A method comprising:
receiving, by a user equipment (UE), first diagnostic information associated with a first communication network, wherein the first diagnostic information includes:
first data defining a first reference signals received power (RSRP) value; and
second data defining a first received signal strength indicator (RSSI) value;
defining a first ping-pong timer value for the first communication network based on the first diagnostic information;
determining to perform a first handover from the first communication network to a second communication network in response to:
the first RSRP value being at least less than a first threshold;
the first RSSI value being at least greater than a second threshold; and
the first ping-pong timer value having expired;
receiving, by the UE, second diagnostic information associated with a second communication network, wherein the second diagnostic information includes:
third data defining a second RSRP; and
fourth data defining a second RSSI;
defining a second ping-pong timer value for the second communication network based on the second diagnostic information;
determining to perform a third handover from the second communication network to the first communication network in response to:

the second RSRP being at least greater than a third threshold, the third threshold different than the first threshold;
the second RSSI being at least less than a fourth threshold;
the second RSRP being at least greater than the first threshold; and
the second ping-pong timer value having expired.

11. The method of claim 10, further comprising:
receiving, by the UE, updated first diagnostic information, the updated first diagnostic information defining at least one of an updated first threshold, an updated second threshold, and an updated first ping-pong timer value; and
determining whether to perform a third handover from the first communication network to the second communication network based on the updated first diagnostic information; and
wherein:
in response to a determination that:
the first RSRP value and the first RSSI value are the same in the first diagnostic information and the updated first diagnostic information; and
at least one of the first threshold, the second threshold, and the first ping-pong timer value are different from the updated first threshold, the updated second threshold, and the updated first ping-pong timer value, respectively; and
performing the third handover.

12. The method of claim 11, further comprising:
receiving, by the UE, updated second diagnostic information, the updated second diagnostic information defining at least one of an updated third threshold, an updated fourth threshold, and an updated second ping-pong timer value; and
determining whether to perform a fourth handover from the second communication network to the first communication network based on the updated second diagnostic information.

13. The method of claim 12, wherein:
in response to a determination that:
the second RSRP value and the second RSSI value are the same in the second diagnostic information and the updated second diagnostic information; and
at least one of the third threshold, the fourth threshold, and the second ping-pong timer value are different from the updated third threshold, the updated fourth threshold, and the updated second ping-pong timer value, respectively; performing the fourth handover.

14. The method of claim 10, further comprising:
adjusting a length of the first ping-pong timer value based on the updated first diagnostic information; and
adjusting a length of the second ping-pong timer value based on the updated second diagnostic information.

15. A non-transitory computer-readable medium storing instructions that, when executed, cause one or more processors to perform operations, comprising:
receiving, by a user equipment (UE), first diagnostic information associated with a first communication network, wherein the first diagnostic information includes:
first data defining a first reference signals received power (RSRP) of a first communication network; and
second data defining a first received signal strength indicator (RSSI) of a second communication network;
defining a first ping-pong timer value for the first communication network based on the RSRP;
performing a first handover from the first communication network to the second communication network in response to:
the RSRP being at least less than a first threshold;
the RSSI being at least greater than a second threshold; and
the first ping-pong timer value having expired;
receiving, by the UE, second diagnostic information associated with a second communication network, wherein the second diagnostic information includes:
third data defining a second RSRP of the first communication network; and
fourth data defining a second RSSI of the second communication network;
defining a second ping-pong timer value for the second communication network based on the second RSSI; and
performing a second handover from the second communication network to the first communication network in response to:
the second RSRP being at least greater than a third threshold;
the second RSSI being at least less than a fourth threshold;
the second RSRP being at least greater than the first threshold; and
the second ping-pong timer value having expired.

16. The non-transitory computer-readable medium of claim 15, wherein:
the first threshold is a first wireless broadband communication network threshold;
the second threshold is a first IEEE 802.11 standard communication network threshold;
the third threshold is a second wireless broadband communication network threshold of a lower value relative to the first wireless broadband communication network threshold; and
the fourth threshold is a second IEEE 802.11 standard communication network threshold of a higher value relative to the first IEEE 802.11 standard communication network threshold.

17. The non-transitory computer-readable medium of claim 15, further comprising operations to adjust a length of the first ping-pong timer value based on the first diagnostic information and the second ping-pong timer value based on the second diagnostic information.

18. The non-transitory computer-readable medium of claim 15, wherein:
the first communication network is a wireless broadband communication network, and
the second communication network is an IEEE 802.11 standard communication network.

19. The non-transitory computer-readable medium of claim 15, further comprising operations to:
receiving, by the UE, at least third diagnostic information; and
adjusting at least one of the first threshold, the second threshold, the third threshold, and the fourth threshold based on the third diagnostic information.

20. The non-transitory computer-readable medium of claim 15, wherein the first ping-pong timer value and the second ping-pong timer value are set at a default value of 10 seconds.

* * * * *